United States Patent [19]

Sands et al.

[11] Patent Number: 5,757,869
[45] Date of Patent: May 26, 1998

[54] APPARATUS AND METHOD FOR DETECTING FRAME SYNCHRONIZATION PATTERN/WORD IN BIT-STUFFED DIGITAL DATA FRAME

[75] Inventors: Jeffrey J. Sands, Huntsville; Michael D. Turner, Madison, both of Ala.

[73] Assignee: ADTRAN, Inc., Huntsville, Ala.

[21] Appl. No.: 508,996

[22] Filed: Jul. 28, 1995

[51] Int. Cl.[6] .................................................. H04L 7/00
[52] U.S. Cl. ........................... 375/366; 375/368; 370/506; 370/522
[58] Field of Search ........................... 375/363, 365, 375/366, 368; 370/505, 506, 509–513, 522, 527, 528

[56] References Cited

U.S. PATENT DOCUMENTS

| | | | |
|---|---|---|---|
| 3,603,735 | 9/1971 | Cleobury et al. | 370/513 |
| 4,298,987 | 11/1981 | Stattel et al. | 375/368 |
| 4,596,981 | 6/1986 | Ueno et al. | 340/825.2 |
| 4,744,081 | 5/1988 | Buckland | 370/514 |
| 4,763,339 | 8/1988 | Sutphin et al. | 375/365 |
| 4,764,941 | 8/1988 | Choi | 375/363 |
| 4,768,192 | 8/1988 | Pattavina et al. | 370/466 |
| 4,879,731 | 11/1989 | Brush | 375/368 |
| 4,884,268 | 11/1989 | Goto | 370/506 X |
| 4,885,746 | 12/1989 | Fukushima et al. | 370/506 |
| 4,943,985 | 7/1990 | Gherardi | 375/362 |
| 4,984,238 | 1/1991 | Watanabe et al. | 370/509 |
| 5,046,074 | 9/1991 | Abiven et al. | 375/362 |
| 5,177,740 | 1/1993 | Toy et al. | 370/337 |
| 5,189,515 | 2/1993 | Chen | 348/535 |
| 5,204,883 | 4/1993 | Blanc | 375/368 |
| 5,430,774 | 7/1995 | Dupuy | 375/240 |
| 5,434,890 | 7/1995 | Kimura et al. | 375/365 |
| 5,557,615 | 9/1996 | Fox | 370/514 |

*Primary Examiner*—Young T. Tse
*Attorney, Agent, or Firm*—Charles E. Wands

[57] ABSTRACT

A frame sync acquisition mechanism accurately locates a frame synchronization word within successive selectively bit-stuffed frames of data by not only looking for the frame sync word in the two expected alternative frame sync word locations based upon either the addition of stuff bits or the lack of such stuff bits, but also selectively examining a pair of additional potential locations, one of which precedes and the other of which succeeds the two expected alternative frame sync word locations. If an exact match with the frame sync word is located in either of the expected locations, that location is selected as the reference for the next succeeding frame. During the search of the next successive frame and for every succeeding frame, an attempt is made to initially match the frame sync word with in either of these expected locations. If unable to do so, the search is expanded to encompass the entire window of location uncertainty, so as to include the two additional locations. During this expanded search, that location which yields the smallest number of bit errors is declared as the reference location for the next succeeding frame. If there is a failure to find an exact match over the course of a plurality of successive frames, an out-of-sync condition is declared, and the frame sync acquisition of mechanism is re-initialized.

46 Claims, 9 Drawing Sheets

APPARATUS AND METHOD FOR DETECTING FRAME SYNCHRONIZATION PATTERN/WORD IN BIT-STUFFED DIGITAL DATA FRAME

FIELD OF THE INVENTION

The present invention relates in general to digital data communication systems, and is particularly directed to a mechanism for detecting the frame synchronization pattern in each of successive frames of serial digital data, for the purpose of maintaining synchronization among successive frames of data, especially those conveyed over time division multiplexed serial data paths, such as digital data service loops, so as to enable time alignment in the course of multiplexing demultiplexed serial data streams into a single serial data stream format.

BACKGROUND OF THE INVENTION

Bellcore-standard pulse-stuffing synchronization, which involves the selective insertion of pulses (bits) into a digital data frame transported over a synchronous digital data channel, is used to maintain clock synchronization for a synchronous digital data channel employing a clock signal that is not bit-synchronous with the digital data signal to be transported. One example of a digital communication system where pulse stuffing synchronization is employed is a time division multiplexing environment, such as that diagrammatically shown in FIG. 1.

In the system of FIG. 1, at a 'west' transmit site 10, a respective one of a plurality of unsynchronized digital data signals 11 is input to an associated pulse-stuffing synchronizer 12, which synchronizes the asynchronous digital data signal 11 to a data clock signal 13 provided by a multiplexer 14. The resulting synchronized data signals, of which signal 15 is representative, and optionally some other data 16, which may consist of synchronization information and overhead information used for monitoring and maintenance purposes, for example, are combined by the multiplexer 14 to form a synchronized digital data output signal stream over a synchronous digital data communication channel 20 linking 'west' (transmitting) site 10 with an 'east' (receiving) site 30.

At the receiving site 30, the synchronized digital data stream on channel 20 is delivered to a demultiplexer 34, which separates or demultiplexes the incoming combined synchronized signal stream into respective synchronized digital data channel signals, of which signal 35 is representative, as well as the optional other data 36. For each of its output channels, demultiplexer 34 also provides a clock signal 33 to respective pulse stuffing desynchronizers 32. Each pulse stuffing desynchronizer 32 removes any stuffing pulses that may have been inserted at the transmit site and provides a desynchronized signal 31 as its output.

FIG. 2 diagrammatically illustrates a full-duplex multiplex digital data communication network employing pulse stuffing synchronization-desynchronization to transport an unsynchronized signal in each direction over a synchronized communication channel 20 between west site 10 and east site 30. In the network illustrated in FIG. 2, unsynchronized, to be transmitted, digital data signals 11 and 41 and other data 16 and 46 are synchronized and multiplexed by pulse stuffing synchronizer-multiplexers 14 and 44, at the respective west and east sites 10 and 30. As in the system of FIG. 1, the other data may consist of synchronization and overhead information used for maintenance and monitoring.

The resulting synchronized signals 15 and 45 are transported to demultiplexer-desynchronizers 17 and 47, by way of digital communication channel 20, which includes a transceiver 21 at the west end of the system, synchronized digital data communication channel 20, and transceiver 22 at the east end 30 of the network. Received synchronized signals 48 and 18 are demultiplexed and desynchronized by demultiplexer-desynchronizer units 47 and 17, respectively, providing demultiplexed signals 49 and 19 and other data signals 25 and 26.

The unsynchronized signals 11 and 41 are only restricted in data rate and frequency; there is no prescribed phase relationship between them. The synchronized signals 15, 18, 48, and 45 are bit-synchronous; the signal clocks in each direction are synchronized to each other. The transceivers 21 and 22 include all necessary circuitry to transmit and receive data over channel 20, and to receive and send data to the multiplexers 14 and 44 and demultiplexers 47 and 17. The transceivers 21 and 22 may modulate the data; in such a case, the data signals across the channel 20 may have a baud rate that has a prescribed relationship to the bit rate of signals 15, 18, 48 and 45. Each transceiver may also split the signal and transport it over several physical connections and recombine them in the receiver portion of the transceiver. Channel 20 may comprise any medium capable of transporting the signals, including, but not limited to, one or more twisted pairs of copper wire. Channel 20 will typically degrade the signal due to interference, resulting in occasional bit errors in the received synchronized signals 18 and 45.

Because the bit-stuffing mechanism employed in the networks diagrammatically illustrated in FIGS. 1 and 2 is selective, the lengths of successive frames, a non-limiting example of which is illustrated as $FRAME_i$ in FIG. 3, can be expected to vary between a minimum or unstuffed frame length FLmin and a maximum or stuffed frame length FLmax (e.g., two 'stuffing' bits longer than the minimum frame length, for a demultiplexed frame). As a consequence, accurately locating a frame synchronization pattern or frame sync word (FSW) within each frame, which is critical to frame synchronization and data recovery, requires that the frame synchronization acquisition mechanism look for the frame sync word in two locations in a frame, and determine whether additional stuff bits were inserted in the frame. If the frame sync word is not accurately located, then, in addition to passing on wrong data for that particular frame, for the next succeeding frame, the receiver will look for the frame sync word in a location based upon what it has previously determined to be the correct location for the immediately preceding frame, but which is, in actuality, the incorrect location for the frame sync word. As a result, the system can be expected to very quickly go out-of-sync, causing a corruption and loss of customer data.

SUMMARY OF THE INVENTION

In accordance with the present invention, the above problem is solved by not only looking for the frame sync word (FSW) in the two expected alternative frame sync word locations (denoted FSWL 1 or FSWL 2), based upon either the addition of (two) stuff bits or the lack of such stuff bits, but by also selectively looking for the frame sync word in a pair of additional potential locations (denoted FSWL 3 and FSWL 0), one of which (FSWL 0) precedes (by a stuff bit pair offset) the first in time of the expected alternative frame sync word location (where no stuff bits have been inserted in the previous frame), and the other of which (FSWL 3) succeeds (e.g., by a two stuff bit (quat/pair) offset, for a demultiplexed frame) the second of the two expected alternative frame sync word locations.

As will be described, for each of two-bit stuff intervals or offsets, the contents of a 'windowed' frame sync word location are compared, bit-for-bit, with the bit contents of the frame sync reference code, in order to determine which of four FSWLs (FSWL 0–FSWL 3) is the most likely location of the FSW. If an exact match with the FSW is located in either of location FSWL 1 or location FSWL 2, that location is selected as the FSW reference for the next succeeding frame. Then, during the search of the next succeeding frame, locations FSWL 1 and FSWL 2, relative to the identified FSW location of its previous frame, are searched for the presence of the FSW. Once the FSW pattern is matched in either of locations FSWL 1 or FSWL 2 for two consecutive frames has occurred, the receiver is declared in sync.

Thereafter, for the next successive frame, immediately following the frame wherein the second consecutive FSW match occurred in one of locations FSWL 1 and FSWL 2, and for every succeeding frame, the frame sync acquisition circuitry initially attempts to locate an exact match of the sign portion of the FSW in either of locations FSWL 1 and FSWL 2 (relative to the identified FSW location in the immediately succeeding frame). If unable to do so for a respective frame, for the next succeeding frame, the frame sync word search is expanded to encompass the entire window of FSW location uncertainty, so as to include the two additional FSW locations FSWL 0 and FSWL 3.

During this expanded search, that FSW location (one of FSWL 0–FSWL 3), which yields the smallest number of bit errors in the compared sign portions of the known FSW and the bit contents of the frame sync word location being examined, is declared as the reference FSW location for the next succeeding frame. If a perfect match is found in FSWL1 or FSWL2, then only FSWL1 or FSWL2 is checked in the succeeding frame. Otherwise, FSWL3 and FSWL0 are also checked. Then, for the next succeeding frame, the synchronization mechanism again attempts to locate the FSW in either FSWL 1 or FSWL 2. If there is a failure to find an exact match between the FSW of a respective frame and the contents of the examined FSW locations FSWL 1 and FSWL 2 for the next immediately successive frame over the course of six successive frames, an out-of-sync condition is declared, and the frame sync acquisition of mechanism is re-initialized.

The architecture of the frame synchronization acquisition mechanism of the present invention comprises a pair of loop frame synchronization processor units, associated with respective time division multiplexed digital data service loops, there being a differential transport delay between the loops. Each loop frame sync processor is coupled with a majority vote logic circuit, which determines which FSW location is the 'best' choice for the reference for the next succeeding frame's locations FSWL 1 and FSWL 2. Each loop frame sync processor processes its associated loop's serial digital data and outputs delayed output serial digital data, plus an in-frame signal for use by downstream receiver processing and data recovery circuitry.

A respective loop frame sync processor unit includes a frame sync word detector initialization section, to which successive frames of digital data are applied. Incoming data is clocked through a shift register of the frame sync word detector, and the data is compared with a stored frame sync pattern reference code. In response to a match between the stored frame sync pattern reference code and the data an SYNC DET output signal is generated. This SYNC DET output signal is coupled to a sync detector counter, which requires a match of the sync pattern within either FSWL 1 or FSWL 2 of an immediately successive frame of data stream, before enabling the remainder of the frame sync acquisition circuity. The sync detector counter enables remaining portions of the sync acquisition circuit, and generates the INFRAME signal, indicating that the sync acquisition circuit is synchronized to the frame sync word.

The sync word comparator and detector initialization section further includes a mismatch counter logic circuit, which monitors the SYNC DET signal. If a perfect match with the frame sync pattern is not detected for six consecutive frames, the mismatch counter logic circuit resets the sync detect or counter and restarts the initialization operation described above. In addition, the mismatch counter logic circuit logically combines the sync detect signal and frame sync word location signals to determine whether there is a perfect match of the frame sync word with locations FSWL 1 or FSWL 2. If not, all four potential locations (FSWL 0–FSWL 3) are checked by the majority vote logic circuit.

The loop frame sync processor unit further includes a FSWL pattern comparator section, which compares the sign bits of the frame sync pattern reference code with the received data stream at the successive frame sync word locations FSWL 0–FSWL 3, in accordance with respective FSWL window enabling signals generated by a sync window generator. As the input data is serialized through the FSWL comparator section, a window associated with a respective FSWL location is compared, bit-by-bit, with the contents of the sign bits of the frame sync pattern reference code. For each mismatch between a respective bit of the reference code and the windowed data, an error signal is generated. The error signals generated for each FSW location are coupled to respective counters which count the number of bit errors in the monitored frame sync pattern contents of the data during the respective FSWL windows. The contents of the counters of each loop having two consecutive frame sync detects are processed by the majority vote logic circuit, which determines the lowest error count FSW location as the reference for the next succeeding frame's locations FSWL 1 and FSWL 2.

The sync window generator includes a counter, which generates the four respectively delayed FSWL window enable signals that are employed by the FSWL pattern comparator section to control its comparison of the sign bits of the frame sync pattern reference code with the received data stream at the four successive frame sync word locations FSWL 0–FSWL 3. The respective stages of the counter are controllably reset by window control signals generated by a counter-register section.

The counter-register section includes a frame duration counter and a multistage register. In response to a load control signal from the majority vote logic circuit, the frame duration counter is controllably loaded with a predefined count value, also supplied from the majority vote logic circuit. The count value supplied by the majority vote logic circuit identifies whichever one of the four possible frame sync word locations (FSWL 1, FSWL 2, FSWL 3 and FSWL 0), the majority vote logic circuit has determined to produce the lowest number of bit errors, based upon an evaluation of each of the bit error counts produced by the FSWL pattern comparator section, for each of the two loops. The multistage register, which is enabled by the carry output of the frame duration counter and is clocked by the baud clock signal, has a plurality of outputs which provide successively delayed FSWL window control signals to individual stages of the four stage counter of sync window generator.

The loop frame sync processor unit also includes a counter load interface and frame sync alignment control section having an FSWL window counter that is enabled by the output of a differential loop transport delay circuit.

The differential loop transport delay circuit provides a delay associated with the maximum differential transport delay between each of the two data service loops, so as to allow the window processing circuitry within the frame sync word detection circuitry of the other loop to complete its operation, whereby the bit error counts from the FSWL pattern comparator section of each loop will be available for analysis by the majority vote logic circuit.

The FSWL window counter has four FSWL associated outputs coupled to respective inputs of a select gate logic circuit, which receives an enabling signal from the majority vote logic circuit, based upon which FSWL window has been determined to have the lowest number of bit errors. The select gate logic circuit is also coupled to receive the INFRAME signal from the sync word comparator and detector initialization section, and asserts the frame sync signal HDSLFS signal in alignment with the delayed loop data, based upon the FSWL window selected by the majority vote logic circuit.

The majority vote logic circuit contains three levels of bit error count comparison, which successively process the bit error count values in the monitored frame sync pattern contents of the data during the respective FSWL windows, as supplied from the FSWL pattern comparator section for each of the two loops. At the first level of bit error count comparison, respective comparators associated with frame sync pattern window locations FSWL 1 and FSWL 2, and associated with frame sync pattern window locations FSWL 3 and FSWL 0 for each loop, controllably cause associated multiplexers to couple the FSWL bit counts of whichever loop has the lowest bit error counts to second level comparators At the second level of bit error count comparison, the lower of the pair of FSWL 1 and FSWL 2 bit counts and the lower of the pair of FSWL 3 and FSWL 0 bit counts are coupled to a third level comparator. The third level comparator determines which of the FSWL 1, FSWL 2, FSWL 3 or FSWL 0 bit counts is lowest, thereby indicating which of the four frame sync word locations FSWL 0-3 is the most probable location of the frame sync word. This output is used to control a gate circuit which receives the check all four locations signal from the error detect logic circuit of the sync word comparator and detector initialization section.

The gate circuit controls a mux-demux circuit, which controllably outputs signals for preloading the multi-bit binary counter of the counter-register section with a predefined count value, identifying that one of the four possible frame sync word locations (FSWL 1, FSWL 2, FSWL 3 and FSWL 0), which the majority vote logic circuit has determined to produce the lowest number of bit errors. Only if neither window location FSWL 1 or FSWL 2 for either loop has provided a perfect match of the frame sync word, will the output of the third level comparator be processed. If either location FSWL 1 or FSWL 2 for either loop has provided a perfect match of the frame sync word, only the FSWL 1 and FSWL 2 outputs of the second level multiplexer will be used to establish the current frame's sync word reference, for establishing the locations FSWL 1 and FSWL 2 for the next succeeding frame.

DETAILED DESCRIPTION

Figure 1:
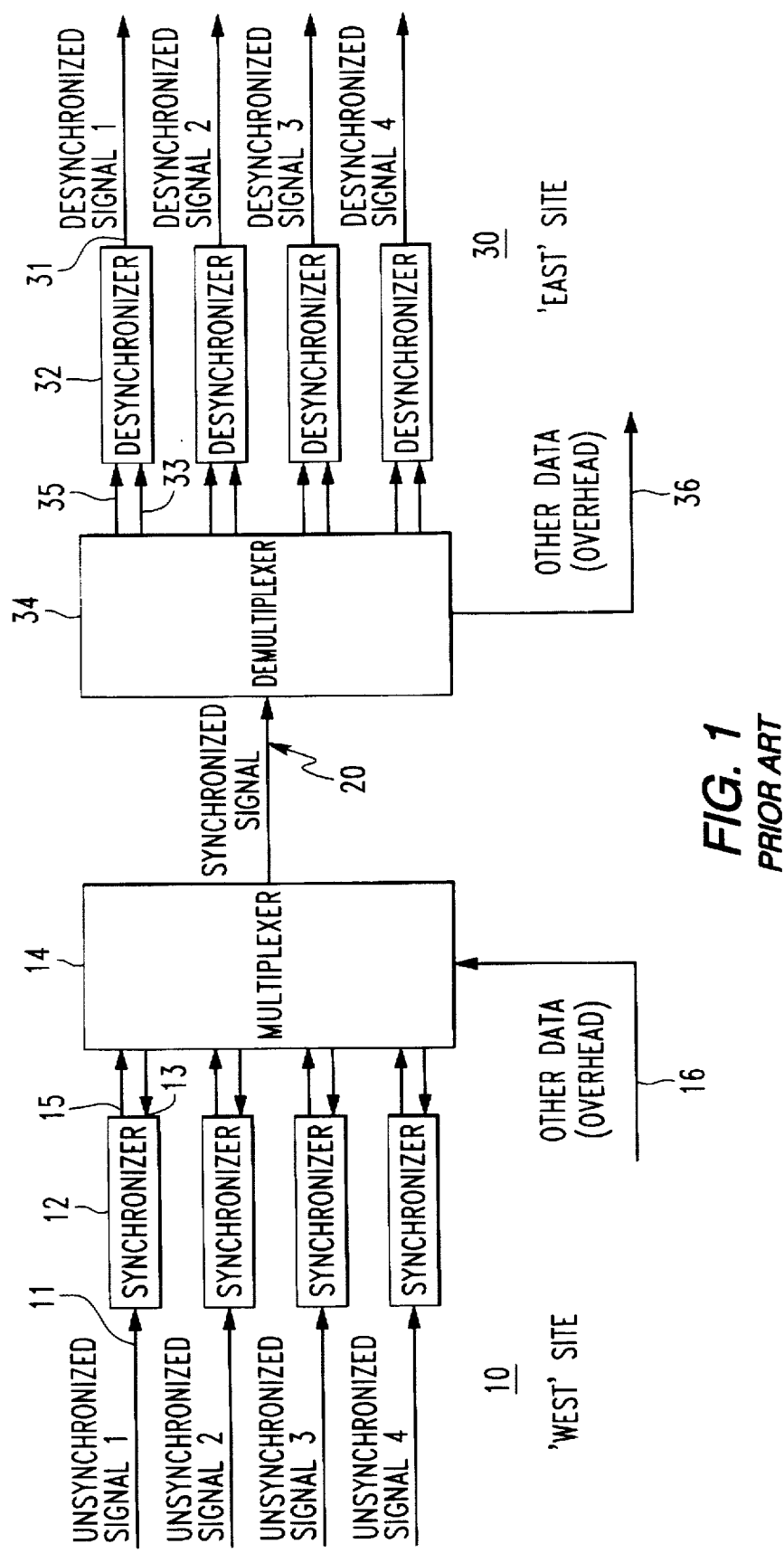
FIG. 1 diagrammatically illustrates an example of a time division multiplexed digital communication system where pulse (bit) stuffing synchronization is employed.
Figure 2:
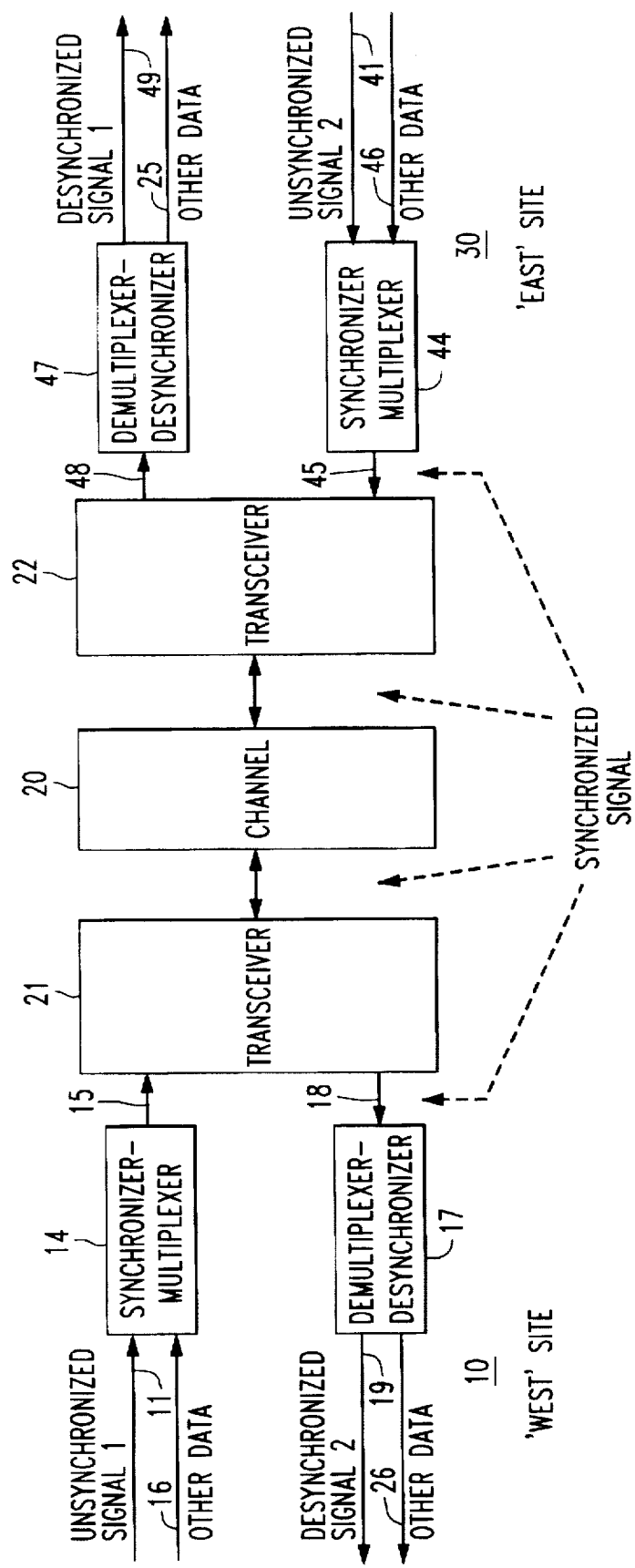
FIG. 2 diagrammatically illustrates an example of a full duplex time division multiplexed digital communication system employing pulse (bit) stuffing synchronization.

Before describing in detail the inventive frame synchronization pattern detection mechanism, which is operative to maintain synchronization among successive frames of data, especially those conveyed over demultiplexed serial digital data paths (digital data service loops), it should be observed that the present invention resides primarily in what is effectively a prescribed arrangement of conventional telecommunication signalling hardware components and attendant supervisory circuitry, that controls the operations of such components. Consequently, the configuration of such components and the manner in which they are interfaced with other communication equipment of a telephone network have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to show the major components of the system in a convenient functional grouping, whereby the present invention may be more readily understood.

As pointed out above, since the lengths of successive frames of digital service loop data can be expected to vary from frame to frame between a minimum (unstuffed) frame length and a maximum (stuffed) frame length, accurately locating the frame sync word (FSWi) within a respective frame $F_i$ requires that the receiver look for the frame sync word in each of two potentially valid locations in the frame, and determine whether additional stuff bits were inserted in the frame. This decision process is complicated by the fact that, if the wrong candidate for the frame sync word location is chosen, then, in addition to passing on wrong data for that particular frame, for the next succeeding frame $F_{i+1}$, the receiver will look for the frame sync word in a location based upon what it has previously determined to be the correct location for the immediately preceding frame $F_i$, but which is, in actuality, not the true location for the frame sync word.

Figure 3:
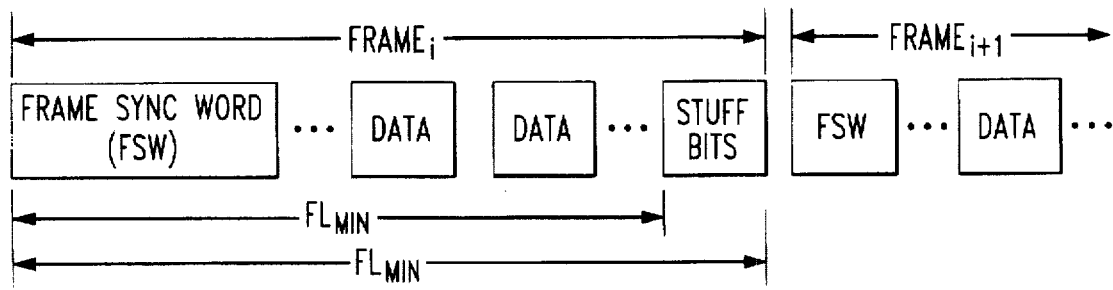
FIG. 3 shows a non-limiting example of a selectively bit-stuffed digital data frame.
Figure 4:
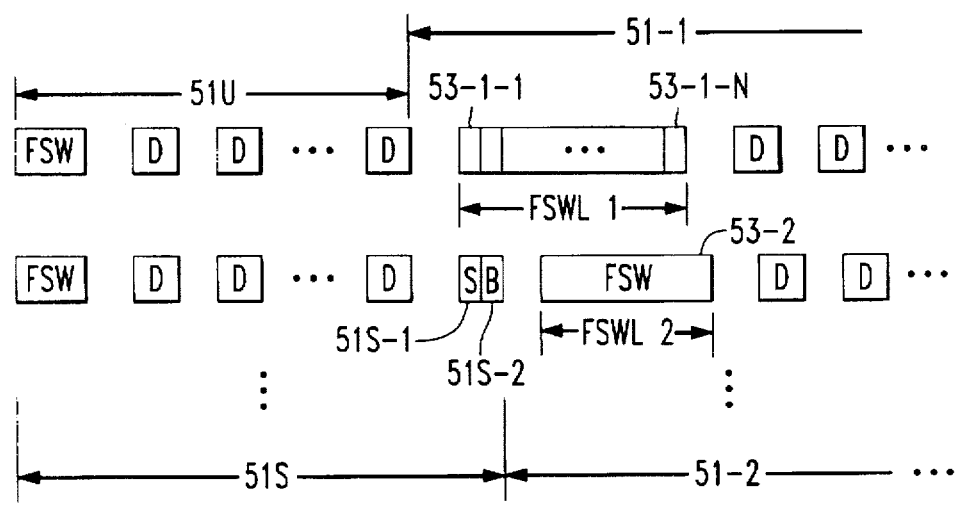
FIG. 4 diagrammatically illustrates a first, arbitrary frame of the type described above with reference to FIG. 3, that immediately succeeds a previous unstuffed frame, such that the frame sync word occupies a first frame sync word location (FSWL 1)

More particularly, FIG. 4 diagrammatically illustrates a first, arbitrary frame 51-1 of the type described above with reference to FIG. 3, that immediately succeeds a previous unstuffed frame 51U, such that the frame sync word FSW 53-1 of frame 51-1 occupies a first frame sync word location (FSWL 1) comprised of sequence of serial data bit locations 53-1-1 ... 53-1-N. For purposes of providing a non-limiting example, the frame sync word 53-1 will be understood to occupy the first fourteen consecutive framing bits 53-1-1 ... 53-1-14 of the frame. The fourteen framing bits 53-1 ... 53-14 comprise interleaved sign and magnitude bits in the multiplexed serial data stream). Also shown in FIG. 4 is a second frame 51-2 that immediately succeeds a stuffed frame 51S, such that the FSW 53-2 of frame 51-2 occurs at a second frame location (FSWL 2), that is delayed in time relative to FSWL 1 by the two stuff bit locations 51S-1 and 51S-2 at the terminating end of the immediately preceding stuffed frame 51S.

Figure 5:
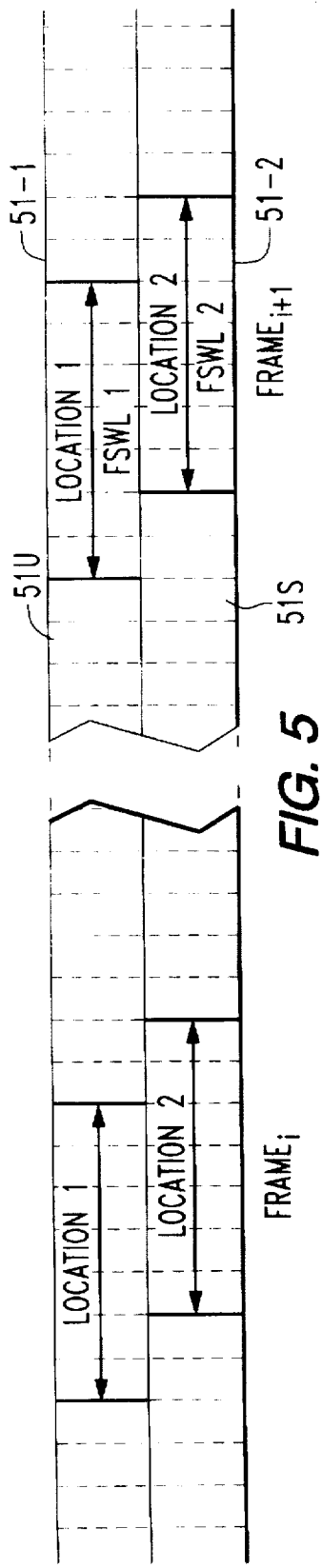
FIG. 5 diagrammatically illustrates a first case of frame sync word location, showing the frame sync word located in either of locations FSWL 1 and FSWL 2.

Assuming that the receiver is in sync, searching locations FSWL 1 and FSWL 2 of the currently received frame (corresponding to the FSW of one of frames 51-1 or 51-2) will cause one of three things to happen. In a first case, Case 1, shown in FIG. 5, if the FSW is actually located in either of the locations FSWL 1 and FSWL 2, and is accurately identified by the receiver, the FSW will be acquired and the receiver will remain in sync.

Figure 6:
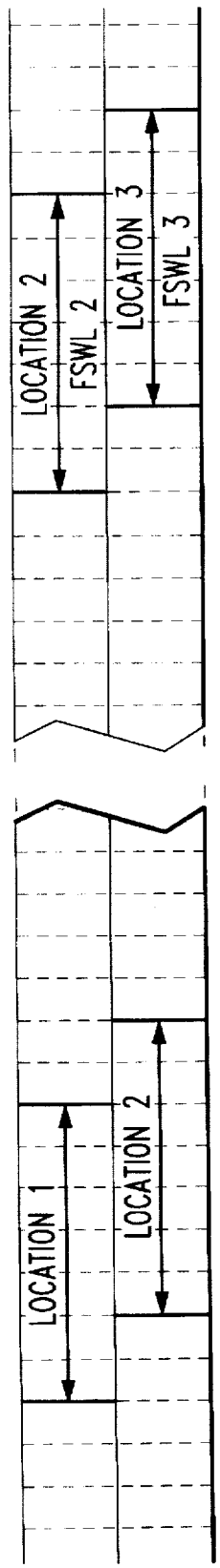
FIG. 6 diagrammatically illustrates a second case of frame sync word location, in which the FSW is actually in FSWL 1, but the frame sync acquisition mechanism has selected FSWL 2 as containing the FSW for the immediately preceding frame, so that it attempts to locate the FSW in either FSWL 2 or a delayed frame sync word location FSWL 3.

In a second case (Case 2), diagrammatically illustrated in FIG. 6, if the FSW is actually in FSWL 1, but the receiver had chosen FSWL 2 as containing the FSW for the immediately preceding frame, then the receiver will now attempt to locate the FSW in either FSWL 2 or a further bit stuff-delayed frame sync word location shown as FSWL 3, which is delayed by two bits from FSWL 2, but neither of which contains the FSW (which is in FSWL 1). If this happens, there is the likelihood that the receiver will remain lost and have to undergo the lengthy process of reacquiring sync.

Figure 7:
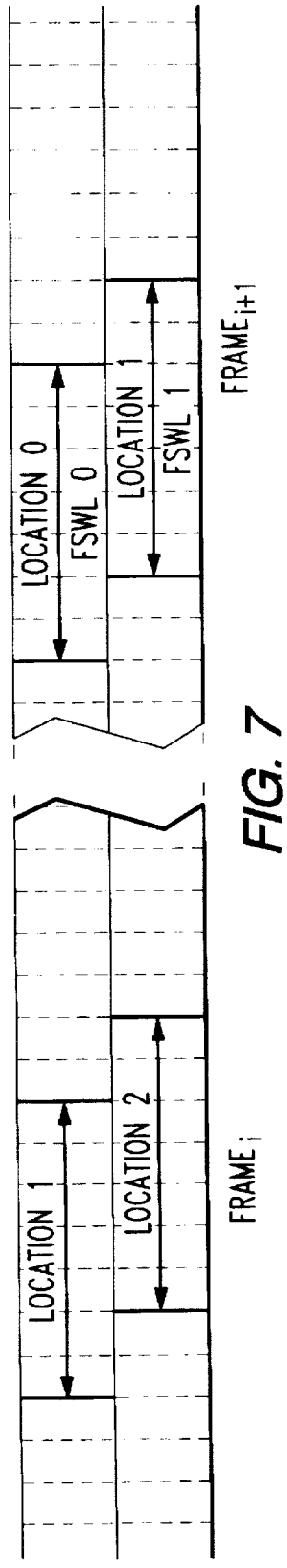
FIG. 7 diagrammatically illustrates a third case of frame sync word location, in which the frame sync acquisition circuitry has chosen FSWL 1 as containing the FSW for the immediately preceding frame, so that it attempts to locate the FSW in FSWL 1 and also a preceding frame sync word location shown as FSWL 0.

In a third case (Case 3), diagrammatically illustrated in FIG. 7, if the receiver had erroneously chosen FSWL 1 as containing the FSW for the immediately preceding frame, then the receiver will now attempt to locate the FSW in FSWL 1 and also a preceding frame sync word location shown as FSWL 0, which leads FSWL 1 by the two bit stuff offset. Again, as in Case 2, the receiver will have to reacquire sync.

This offset problem is solved in accordance with the present invention by first looking for the frame sync word FSW in the two expected alternative frame sync word locations (FSWL 1 and FSWL 2) of each of a pair of transport loops carrying the multiplexed communication signals. If the FSW is perfectly identified (bit-for-bit), its location (one of locations FSWL 1 and FSWL 2) is accepted as correct. However, if the attempted match with the FSW for each of FSWL 1 and FSWL 2 is less than perfect, or the identified location is not the same for both loops, that location (FSWL 1 or FSWL 2) which provides the better (lower number of bit errors) FSW match is selected and, for the next frame, both FSWL 1 and FSWL 2 and two additional potential locations (FSWL 0 and FSWL 3) are searched for the FSW.

More particularly, FIG. 7 diagrammatically illustrates the case where the FSWL 0 precedes (by a stuff bit offset) FSWL 1 of the expected alternative frame sync word locations (FSWL 1 and FSWL 2), where no stuff bits have been inserted in the previous frame, and the other of which (FSWL 3) succeeds (by a stuff bit pair offset) the second (FSWL 2) of the two expected alternative frame sync word locations, where a stuff bit has been inserted in the previous frame. As will be described, where the sync word search mechanism of the invention is operative to examine each of locations FSWL 0–FSWL 3, then whichever FSWL provides the best FSW match (smallest bit comparison error) is selected as the FSWL of the FSW for the current frame, and the search of the unstuffed and stuffed offset pair (FSWL 1 and FSWL 2) in the next succeeding frame is referenced relative to the selected location of the current frame.

Figure 8:
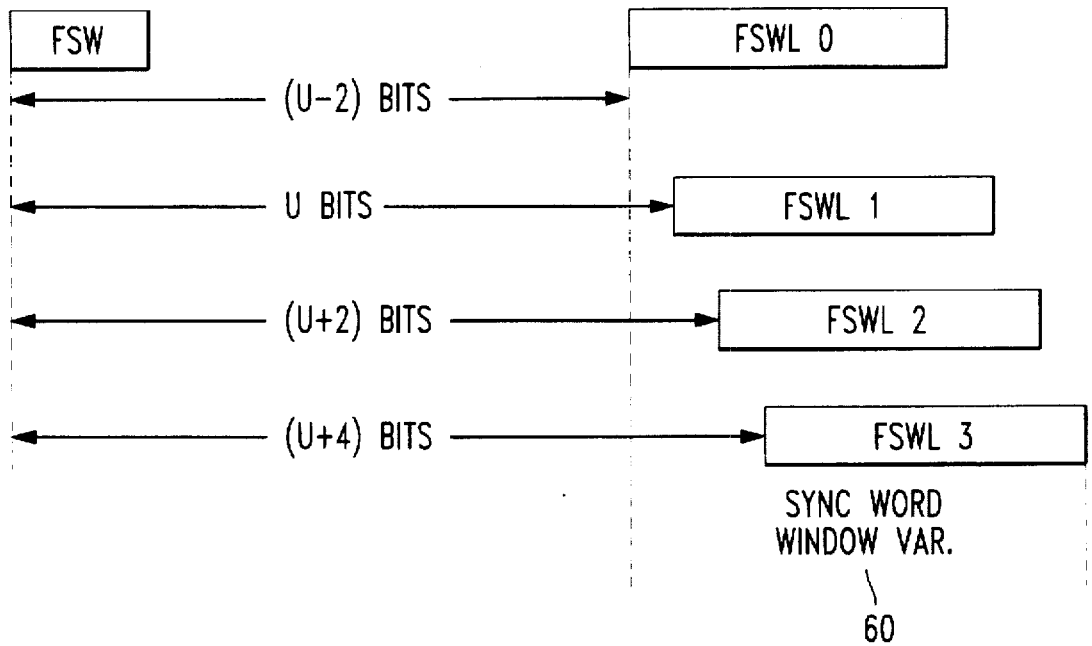
FIG. 8 diagrammatically illustrates a range of FSWL uncertainty, which encompasses the range of potential FSWL variation (FSWL 0 to FSWL 3), employed by the present invention for frame sync word acquisition.

FIG. 8 diagrammatically illustrates a range of FSWL uncertainty, or sync word window 60, which encompasses the range of potential FSWL variation (FSWL 0 to FSWL 3), employed by the present invention to avoid the potential inaccuracy and loss of sync problem discussed above. As shown therein, for purposes of providing a non-limiting parametric example, the FSW header at the beginning of an unstuffed data frame 51U is followed by a plurality of data and overhead bits (D), yielding a total unstuffed frame length of U bits. Since a stuffed frame 51S contains two extra bits (terminating the frame), it will have a total length of U+2 bits.

Thus, in FIG. 8, like the diagrammatic illustration of FIG. 3, the FSW 53-1 of frame 51-1 (that succeeds unstuffed frame 51U) occurs at frame sync word location FSWL 1, which begins immediately following the Uth bit of frame 51U, while the FSW 53-2 of frame 51-2 (following a stuffed frame 51S) occurs at FSWL 2, which begins immediately following the U+2nd bit of frame 51S. In order to accommodate the uncertainty of FSWL 0, which precedes FSWL 1 by two (stuff) bits and begins immediately following a bit position corresponding to the U-2nd bit of frame 51U, and the uncertainty of FSWL 3, which succeeds FSWL 2 by two (stuff) bits and begins immediately following a bit position corresponding to the U+4th bit of frame 51S, the sync word window 60 is effectively shifted, two bits at the time, across the range of frame sync word uncertainty.

As will be described, for each of these two-bit intervals or offsets, the contents of the 'windowed' frame sync word location are compared, bit-for-bit, with the bit contents of the FSW pattern, to determine which of the four locations is the most likely location of the FSW. If an exact match with the FSW is located in either of location FSWL 1 or location FSWL 2, that location is selected as the FSW reference for the next succeeding frame. Then, during the search of the next succeeding frame, locations FSWL 1 and FSWL 2, relative to the identified FSW location of its previous frame, are searched for the presence of the FSW. Once an exact match of the FSW pattern in either of locations FSWL 1 or FSWL 2 for two consecutive frames has occurred, the receiver is declared in sync.

Thereafter, namely, for the next successive frame immediately following the frame wherein the second consecutive FSW match occurred in one of locations FSWL 1 and FSWL 2, and for every succeeding frame, the receiver initially attempts to locate an exact match of the sign portion of the FSW in either of locations FSWL 1 and FSWL 2 (as referenced to the identified FSW location in the immediately succeeding frame). If unable to do so, the window with the least bit errors (FSWL1 or FSWL2) is chosen and, on the next succeeding frame, the search is expanded to encompass the entire window of FSW location uncertainty, so as to include the two additional FSW locations FSWL 0 and FSWL 3. During this expanded search, that one of the four FSW locations FSWL 0-FSWL 3, which yields the smallest number of bit errors in the compared sign portions of the known FSW and the bit contents of the frame sync word location being examined, is declared as the reference FSW location for the next succeeding frame. Then, for the next succeeding frame, the synchronization mechanism again attempts to locate the FSW in FSWL0-FSWL3 until a perfect match is found in FSWL 1 or FSWL 2, as described above.

If there is a failure to find an exact match between the FSW of a respective frame and the contents of the examined FSW locations FSWL 1 and FSWL 2 for the next immediately successive frame over the course of six successive frames, the receiver is declared out-of-sync, and the synchronization mechanism is re-initialized to looking for two consecutive frames in which an exact match must occur in one of locations FSWL 1 and FSWL 2, in order to reacquire sync.

Figure 9:
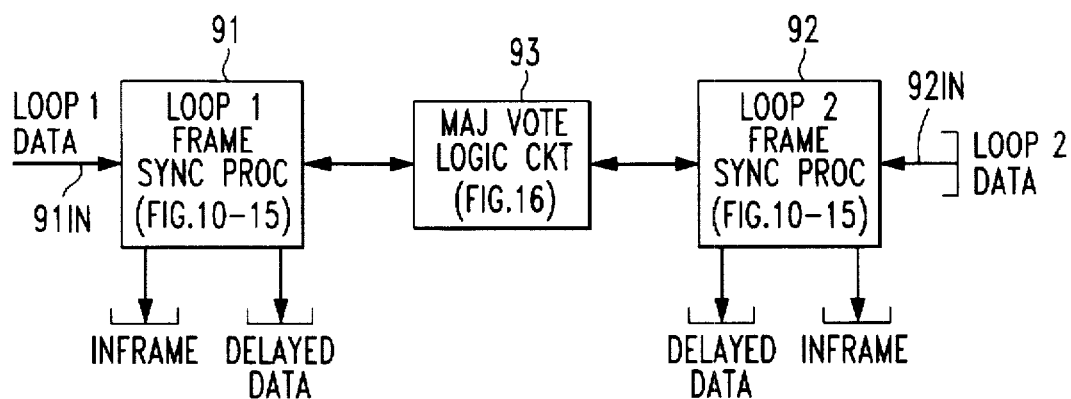
FIG. 9 diagrammatically illustrates the overall architecture of the frame synchronization acquisition mechanism of the present invention.

Referring now to FIG. 9, the overall architecture of the frame synchronization acquisition mechanism of the present invention is diagrammatically illustrated as comprising first and second loop frame synchronization processor units, respectively identified as loop 1 frame sync processor unit 91 and loop 2 frame sync processor unit 92, which are coupled to a majority vote logic unit 93. (The configuration of each of the frame sync processor units 91 and 92 is shown in detail in FIGS. 10-15, while the configuration of the majority vote logic circuit 93 is shown in detail in FIG. 16, to be described.)

Loop 1 frame sync processor unit 91 has an input port 91IN is coupled to a first digital data service loop (Loop 1) over which time division multiplexed data has been transmitted, and loop 2 frame sync processor unit 92 has an input port 92IN coupled to a second digital data service loop (Loop 2) over which other time division multiplexed data has been transmitted, but which has some prescribed differential transport delay relative to Loop 1. As will be described, each loop frame sync processor is operative to process its associated loop's serial digital data stream and to output a delayed output serial digital data stream HDSL1, HDSL2 and an in-frame signal INFRAME1, INFRAME2 for use by downstream receiver processing and data recovery circuitry, not shown. Since the architecture of each frame sync processor is the same, its configuration for only one of the loops will be described in detail.

Figure 10:
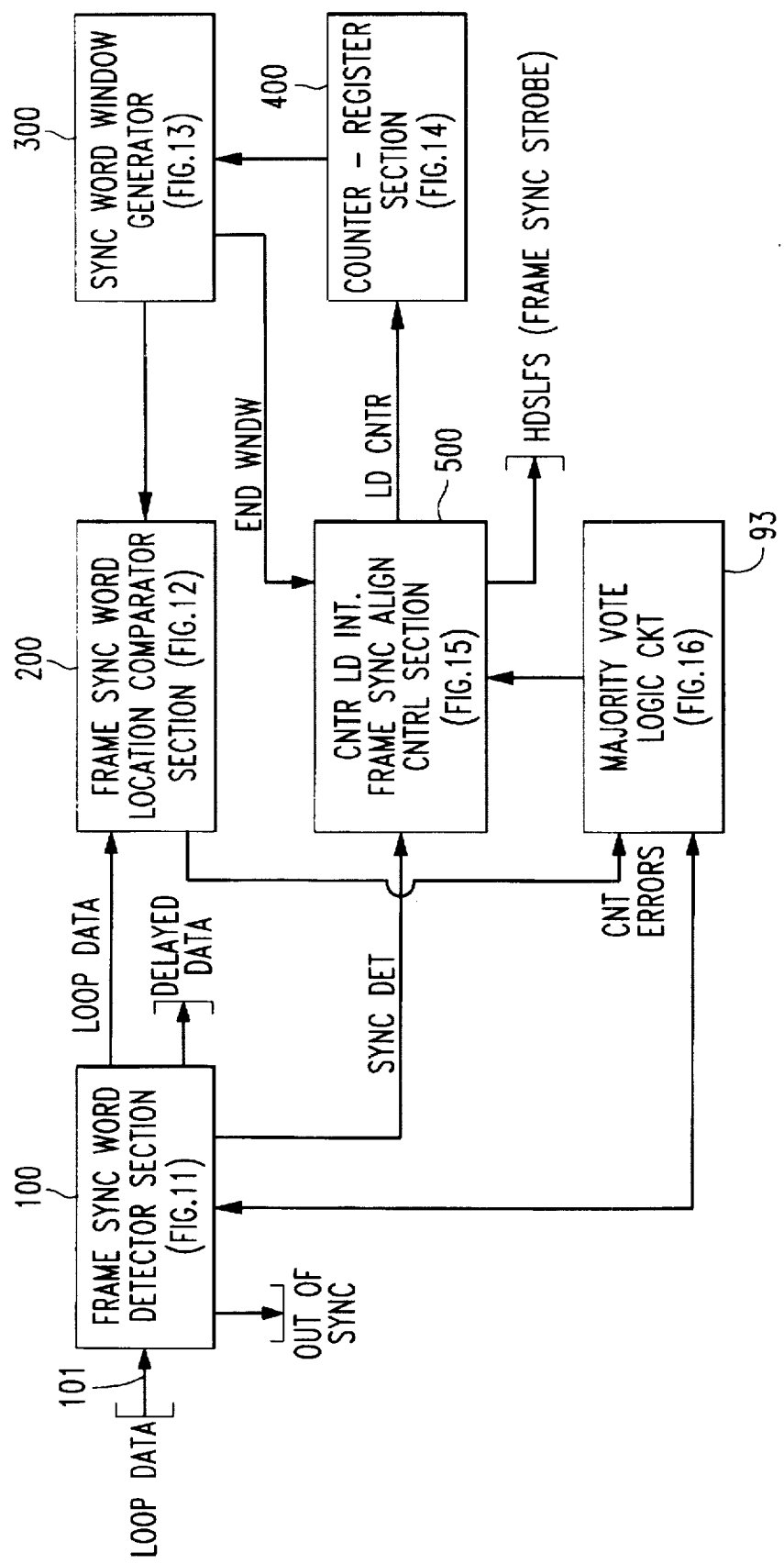
FIG. 10 diagrammatically illustrates the configuration of a loop frame sync processor unit.

FIG. 10 diagrammatically illustrates the configuration of a loop frame sync processor unit as comprising a frame sync word detector initialization section 100 (shown in detail in FIG. 11, to be described), having a data input port 101 coupled to receive an incoming digital data stream comprised of successive frames of digital data, formatted as described above. As will be described in detail with reference to FIG. 11, the frame sync word detector initialization section 100 includes a shift register which accommodates the length of the sign and magnitude bit segments of the frame sync word, and provides a prescribed additional delay (e.g. ten bits in T1 mode, as a non-limiting example) to the input data stream, so as to allow majority vote processing and proper placement of a frame sync FS signal.

As incoming data is clocked through the shift register of the frame sync word detector initialization section 100, its contents are compared in a pattern comparator with a stored frame sync pattern reference code. As a non-limiting example, the seven bit sync pattern for loop 1 may be 111 0010, while that of loop 2 may be the loop 1 pattern with the bits reversed, i.e. 010 0111. Seven zeros (0s) must be present in the magnitude bits and the loop pattern must be present in the sign bits before SYNC DET is determined for a total of fourteen (14) bits.

In response to detecting a perfect or exact match between the stored frame sync pattern reference code applied and data being clocked through the shift register, the pattern comparator outputs a SYNC DET output signal. This SYNC DET output signal is coupled to a sync detector counter which is configured to require detection of a perfect match of the sync pattern within either FSWL 1 or FSWL 2 of an immediately successive frame of data stream before enabling the remainder of the frame sync acquisition mechanism of the present invention. The sync detector counter generates a GOOD loop output signal which is employed to enable remaining portions of the sync acquisition circuit, and an INFRAME signal, which indicates that the sync acquisition circuit is synchronized to the frame sync word.

Sync word comparator and detector initialization section 100 also includes a mismatch counter logic circuit. If a perfect match with the frame sync pattern is not detected for six consecutive frames, the mismatch counter logic circuit resets the sync detector counter and restarts the initialization operation described above. In addition, the mismatch counter logic circuit logically combines the sync detect signal and frame sync word location signals to determine whether there is a perfect match of the frame sync word with locations FSWL 1 or FSWL 2. If not, all four potential locations are checked by the majority vote logic circuit 93.

The loop frame sync processor unit further includes a FSWL pattern comparator section 200 (shown in detail in FIG. 12, to be described), which compares the sign bits of the frame sync pattern reference code with the received data stream at the successive frame sync word locations FSWL 0-FSWL 3, in accordance with respective FSWL window enabling signals generated by a sync window generator 300. As the input data is serialized through the FSWL comparator section, a window associated with a respective FSWL location is compared, bit-by-bit, with the contents of the sign bits of the frame sync pattern reference code. For each mismatch between a respective bit of the reference code and the windowed data, an error signal is generated. The error signals generated for each FSW location are coupled to respective counters which count the number of bit errors in the monitored frame sync pattern contents of the data during the respective FSWL windows. The contents of these counters are monitored by the majority vote logic circuit 93, to determine which FSW location is the 'best' choice as the reference for the next succeeding frame's locations FSWL 1 and FSWL 2.

The sync window generator 300 (shown in detail in FIG. 13, to be described) comprises a four stage counter, which generates the four respectively delayed FSWL window enable signals FSWL 1, FSWL 2, FSWL 3 and FSWL signals that are employed by the FSWL pattern comparator section 200, to control its comparison of the sign bits of the frame sync pattern reference code with the received data stream at the successive frame sync word locations FSWL 0–FSWL 3. The respective stages of the four stage counter are controllably reset by window control signals generated by a counter-register section 400 (shown in detail in FIG. 14, to be described).

Counter-register section 400 includes a frame duration counter and a multistage register. In response to a load control signal LOAD CNTR from section 500 (FIG. 10), the frame duration counter is controllably loaded with a predefined count value supplied from the majority vote logic circuit 93. The count value supplied by the majority vote logic circuit identifies whichever one of the four possible frame sync word locations (FSWL 1, FSWL 2, FSWL 3 and FSWL 0), the majority vote logic circuit 93 has determined to produce the lowest number of bit errors, based upon an evaluation of each of the bit error counts produced by the FSWL pattern comparator section 200, for each of loops 1 and 2. The multistage register, which is enabled by the carry output of the frame duration counter and is clocked by the baud clock signal, has a plurality of outputs which provide successively delayed FSWL window control signals to individual stages of the four stage counter of sync window generator 300.

Further included in the loop frame sync processor unit is a counter load interface and frame sync alignment control section 500 (shown in detail in FIG. 15 to be described), which comprises an FSWL window counter that is enabled by the output of a differential loop transport delay circuit. The differential loop transport delay circuit provides a delay associated with the maximum differential transport delay between each of loops 1 and 2, that allows the window processing circuitry within the frame sync word detection circuitry of the other loop to complete its operation, so that the bit error counts from the FSWL pattern comparator section 200 of each of loops 1 and 2 will be available for analysis by the majority vote logic 93.

The FSWL window counter has four FSWL associated outputs coupled to respective inputs of a select gate logic circuit, which receives an enabling signal from the majority vote logic 93, based upon which FSWL window has been determined to have the lowest number of bit errors. The select gate logic circuit is also coupled to receive the INFRAME signal from the sync word comparator and detector initialization section 100 of FIG. 11, described above, and asserts the frame sync signal HDSLFS signal in alignment with the delayed loop data, based upon the FSWL window selected by the majority vote logic circuit.

Figure 11:
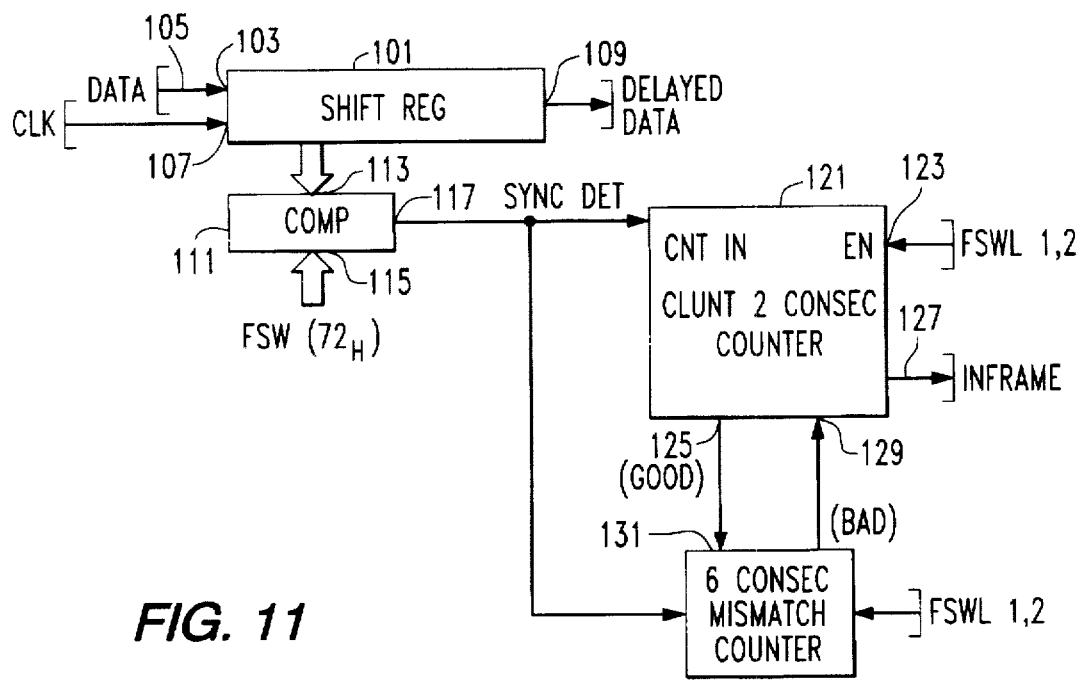
FIG. 11 diagrammatically illustrates the configuration of the sync word comparator and detector initialization section of the frame sync processor unit of FIG. 10.
Figure 12:
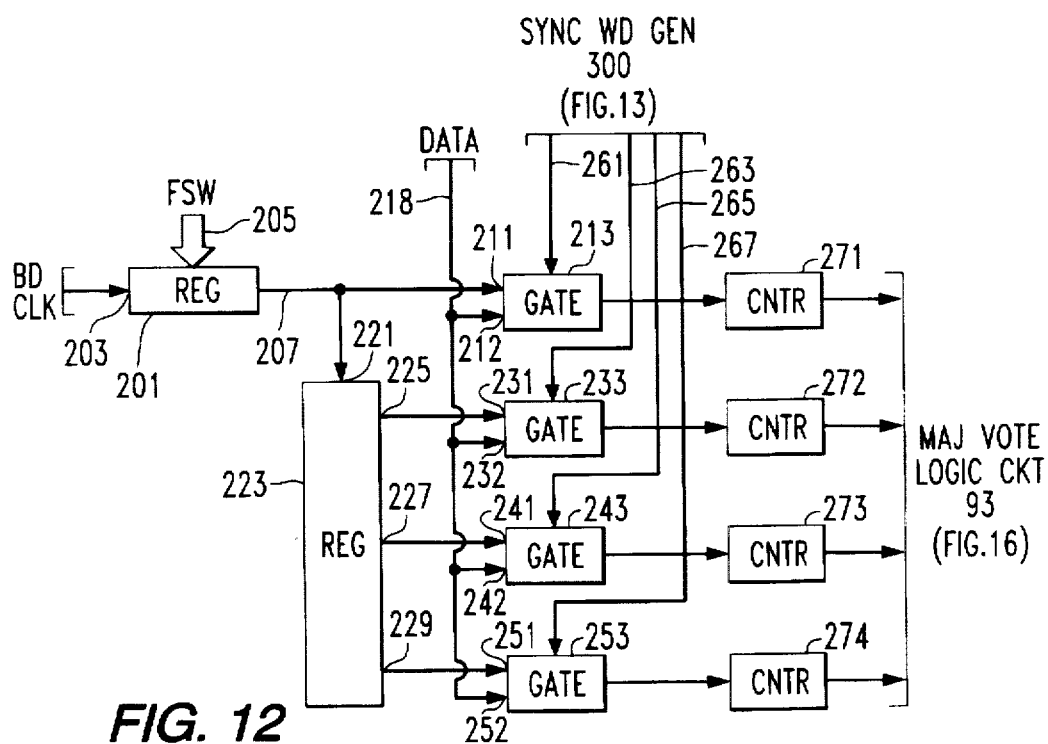
FIG. 12 diagrammatically illustrates the configuration of the FSWL pattern comparator section of the loop frame sync processor unit of FIG. 10.

The majority vote logic circuit 93 of FIG. 9 contains three levels of bit error count comparison, which successively process the bit error count values in the monitored frame sync pattern contents of the data during the respective FSWL windows, as supplied from the FSWL pattern comparator section 200 of FIG. 12 for each of loops 1 and 2. At the first level, respective comparators associated with frame sync pattern window locations FSWL 1 and FSWL 2, and associated with frame sync pattern window locations FSWL 3 and FSWL 0 for each loop to controllably cause associated multiplexers to couple the FSWL bit counts of whichever loop has the lowest bit error counts to second level comparators. The second level comparators cause associated multiplexers to couple the lower of the pair of FSWL 1 and FSWL 2 bit counts and the lower of the pair of FSWL 3 and FSWL 0 bit counts to a third level comparator. The third level comparator determines which of the FSWL 1, FSWL 2, FSWL 3 or FSWL 0 bit counts is lowest, so as to indicate which of the four frame sync word locations FSWL 0–3 is the most probable location of the frame sync word. This output is used to control a gate circuit which receives the check all four locations signal CHK 4 from the error detect logic circuit of FIG. 11 for each loop, described above.

The gate circuit controls a mux-demux circuit, which controllably outputs signals for preloading the multi-bit binary counter of the counter-register section 400 with a predefined count value, that identifies that one of the four possible frame sync word locations (FSWL 1, FSWL 2, FSWL 3 and FSWL 0), which the majority vote logic circuit has determined to produce the lowest number of bit errors. Only if neither window location FSWL 1 or FSWL 2 for either loop has provided a perfect match of the frame sync word, will the output of the third level comparator be processed. If either location FSWL 1 or FSWL 2 for either loop has provided a perfect match of the frame sync word, only the FSWL 1 and FSWL 2 outputs of the second level multiplexer will be used to establish the current frame's sync word reference, for establishing the locations FSWL 1 and FSWL 2 for the next succeeding frame.

Referring now to FIG. 11, the sync word comparator and detector initialization section 100 of the frame sync processor unit of FIG. 10 is diagrammatically illustrated as comprising a shift register 101, having a serial input 103 coupled to data input link 105 over which the input digital serial data stream is supplied to the sync detector. A clock signal is applied to clock input 107. Shift register 101 has a length sufficient to accommodate the length of the sign and magnitude segments of the sync word, and to provide a prescribed additional delay to the input data stream, so as to allow majority vote processing and placement of the frame sync signal HDSLFS, as will be described. As a non-limiting example, for each of the sign and magnitude segments of a (fourteen bit) sync word, and allowing for a prescribed delay (e.g., ten bits for T1 mode, as described above) for subsequent processing, the length of shift register 101 may be thirty-four bits, so that the data stream exiting the output port 109 of the shift register is delayed with respect to its application at input port 103 by thirty-four bits.

The first fourteen stages of shift register 101 are coupled to first set of inputs 113 of a fourteen bit sync pattern comparator 111, a second set of fourteen inputs 115 to which is coupled to receive the fourteen bit sync pattern proper. Sync pattern comparator 111 is operative to continuously compare the contents of those fourteen stages of shift register 101 to which the first set of inputs 113 are respectively connected with the sign and magnitude components of the sync pattern supplied to inputs 115. As described above, in the present example, the sync pattern for loop 1 is seven zeros (0s) plus the bits 111 0010, while that of loop 2 is seven zeros (0s) plus the bits 010 0111.

As a received frame of serial data is clocked through shift register 101, upon detecting a match between the sync pattern applied to inputs 115 and the contents of the first fourteen stages of shift register 101, comparator 111 provides a SYNC DET output on link 117. This SYNC DET output signal on link 117 is coupled to a sync detector counter 121 which, as referenced previously, requires that sync pattern comparator detect a perfect match of the sync pattern within either FSWL 1 or FSWL 2 for two consecutive frames of serial data stream being clocked through the shift register 101 before allowing the frame sync generation mechanism of the present invention to take effect.

Figure 13:
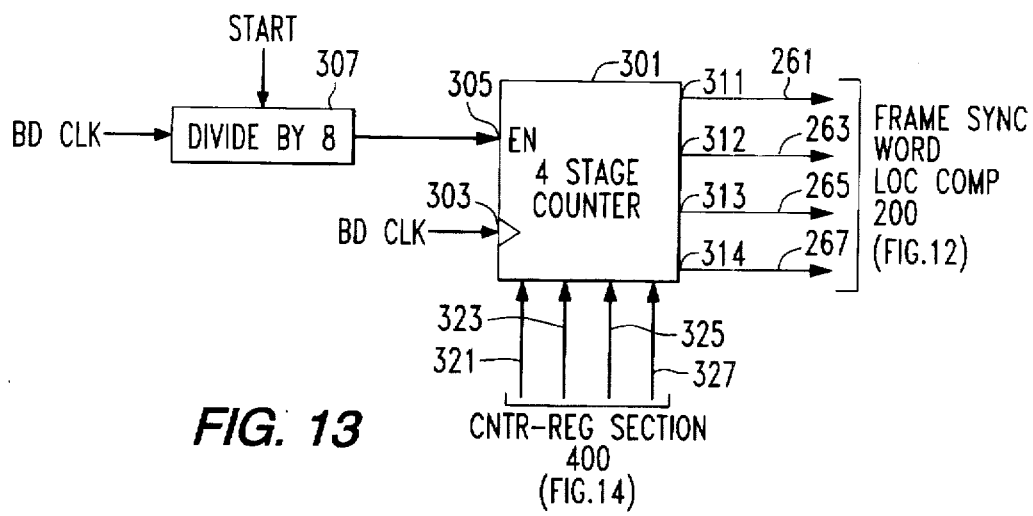
FIG. 13 diagrammatically illustrates the configuration of the sync window generator of the loop frame sync processor unit of FIG. 10.

For this purpose, sync detector counter 121 is configured as a gated two-bit counter, which is clocked by the SYNC DET signal on link 117 and is controllably enabled by an input link 123 from the sync window generator 300, shown in FIG. 13, to be described. Link 123 is coupled to receive FSWL 1 and FSWL 2 window signals output by sync window generator 300, so that, once a first valid SYNC DET signal has been generated, which increments counter 121 from its reset or zero state, counter 121 will look for the next SYNC DET signal at that portion of the received serial data stream where the next successive framing pattern should be, namely either at FSWL 1 or, if stuff bits are present, at FSWL 2. If a SYNC DET signal is received by counter 121 during this observation window, counter 121 generates a GOOD loop output signal on link 125 and an INFRAME signal on link 127. The GOOD output signal is employed to enable out portions of the sync detector, while the INFRAME signal indicates that the sync detector is currently synchronized to the frame sync word.

The sync word comparator and detector initialization section 100 also includes a mismatch counter logic circuit 131, comprised of combinational logic and flip-flops, and which is operative to monitor respective signal links for the failure to obtain a perfect match with the frame sync word for six consecutive frames. If a perfect match with the frame sync pattern is not detected for six consecutive frames, then a loss of frame or BAD signal is generated and applied to an input 129 of gated counter 121, which resets counter 121, and restarts the initialization operation (requiring two consecutive pattern matches), described above. Logic circuit 131 logically combines the sync detect signal and the frame sync word location signals to determine whether the frame sync word was detected for FSWL 1 or FSWL 2. If not, a check all four locations signal CHK 4 is generated and supplied to the majority vote logic circuit, as will be described.

Referring now to FIG. 12, the FSWL pattern comparator section 200 is diagrammatically illustrated as comprising a pattern storage register 201, having a clock input 203 coupled to which the baud clock is supplied and a set of (seven) pattern inputs 205 to which the sign bits of the sync word for that respective loop is supplied. For the loop 1, therefore, the bit pattern 111 0010 is coupled to pattern inputs 205 of pattern storage register 201.

The output 207 of register 201 is coupled over link 209 to a first input 211 of a first gate stage 213 and to the input 221 of a multistage serial delay register 223. Multistage serial delay register 223 has a plurality of delay outputs 225, 227 and 229 which provide successive amounts of delay equal to the length of a bit stuff or, in the present example, two bits of delay per stage output. Thus, register output 225 is two bits delayed relative to the pattern signal clocked out of register 201 on link 207, while register outputs 227 and 229 are delayed by two bits and four bits, respectively, with respect to register output 225. The delayed versions of the clocked pattern at delay outputs 225, 227 and 229 are respectively applied to first inputs 231, 241 and 251 of gate stages 233, 243 and 253. Second inputs 212, 232, 242 and 252 of respective gate stages 213, 233, 243 and 253 are coupled to receive the serial data stream applied over link 218.

Gate stages 213, 233, 243 and 253 are enabled by respective FSWL 1, FSWL 2, FSWL 3 and FSWL 0 enabling signals applied thereto via respective links 261, 263, 265 and 267, from the sync window generator 300 of FIG. 13. When so enabled, each gate stage (which may comprise an exclusive-OR based logic circuit) generates an output in accordance with the logical state of each of its two inputs. As long as the two inputs of a respective gate stage match, the gate stage output is a logical zero. If the two inputs do not match, the gate stage output is a logical one. Thus, as each gate is enabled during a respective FSWL window, the input data serialized over link 218 (corresponding to the seven bits of the sign segment of the frame sync word) is effectively compared, bit-by-bit, with the contents of the sign bit segment of the frame sync pattern clocked out of register 201. For each mismatch of a respective bit of the pattern and the data, a one is generated.

The outputs of gate stages 213, 233, 243 and 253 are coupled to respective counters 271, 272, 273 and 274, which count the number of bit errors in the monitored frame sync pattern contents of the data during the respective FSWL windows. The contents of counters 271, 272, 273 and 274 are coupled over links 281, 282, 283 and 284, respectively, to the majority vote logic circuit 93.

The sync window generator 300 is diagrammatically illustrated in FIG. 13 as comprising a counter 301 (comprised of a set of four-cascaded flip-flops), having its clock input 303 coupled to receive the baud clock. Its enable EN input 305 is coupled to the output of a divide by eight divider 307, which is coupled to receive a window start signal supplied by the frame sync alignment control section 500, shown in FIG. 15, to be described. Divide-by-eight divider 307 serves to provide a seven-bit wide window which is effectively successively stepped or translated through the respective stages of counter 301, which start in synchronism with respective FSWL window enable inputs 321, 323, 325 and 327 coupled to the respective stages of counter 301 from the counter-register section, shown in FIG. 14, to be described. At its outputs 311, 312, 313 and 314, counter 301 provides respectively delayed FSWL window enable signals FSWL 1, FSWL 2, FSWL 3 and FSWL signals. As described above, with reference to the FSWL pattern comparator section 200 of FIG. 12, these FSWL 1, FSWL 2, FSWL 3 and FSWL 0 enable signals are applied via respective links 261, 263, 265 and 267 to the respective gate stages 213, 233, 243 and 253.

Figure 14:
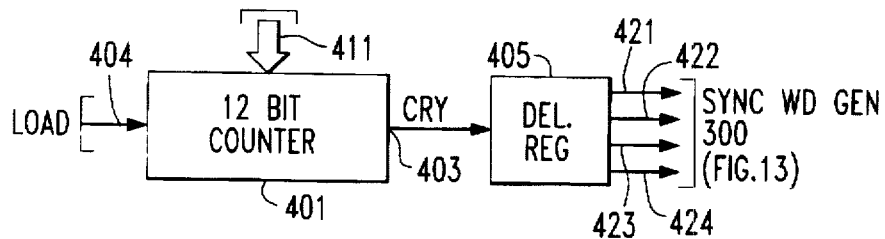
FIG. 14 diagrammatically illustrates the configuration of the counter-register section of the loop frame sync processor unit of FIG. 10.

The counter-register section 400 is diagrammatically illustrated in FIG. 14 as comprising a multi-bit binary counter 401, the number of stages of which is sufficient to accommodate the length of a frame (e.g. twelve bits in the present example). In response to a load control signal LOAD CNTR applied to input 404 from the frame sync alignment control section 500 of FIG. 15, counter 401 is controllably loaded with a predefined count value supplied via bus 411 from the majority vote logic circuit 93. As will be described, the count value supplied via bus 411 by majority vote logic circuit 93 identifies that one of the four possible frame sync word locations (FSWL 1, FSWL 2, FSWL 3 and FSWL 0), which the majority vote logic circuit 93 has determined to produce the lowest number of bit errors, based upon an evaluation of each of the bit error counts produced by the FSWL pattern comparator section 200 of FIG. 12, for each of loops 1 and 2.

The last stage of counter 401 has its carry output 403 coupled to a multistage delay register 405. Like the multistage serial delay register 223 of FIG. 12, multistage serial delay register 405 has a plurality of outputs 421, 422, 423 and 424, which provide the successively delayed FSWL window enable signals FSWL 1, FSWL 2, FSWL 3 and FSWL 4 signals via respective links 261, 263, 265 and 267 to the respective gate stages 213, 233, 243 and 253 of the FSWL pattern comparator section 200 of FIG. 12.

Figure 15:
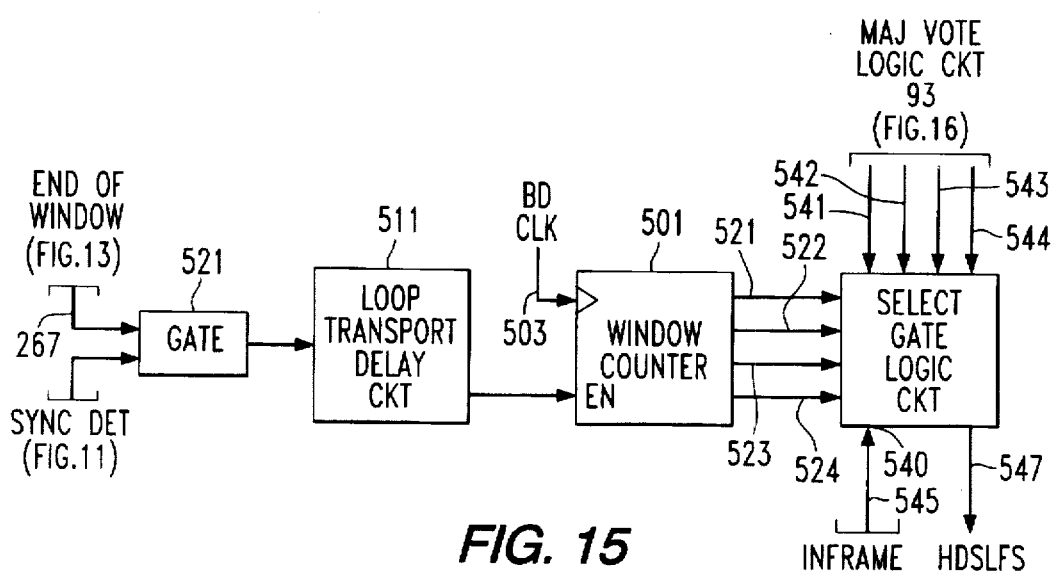
FIG. 15 diagrammatically illustrates the configuration of the counter load interface and frame sync alignment control section of the loop frame sync processor unit of FIG. 10.

The counter load interface and frame sync alignment control section 500 is diagrammatically illustrated in FIG. 15 as comprising an FSWL window counter 501, which is operative to count the BAUD CLK signal applied to its clock input 503 when enabled by the output of a differential loop transport delay circuit 511. Differential loop transport delay circuit 511 is coupled to the output of a gate circuit 521, which receives the FSWL 0 window enable signal on link 267 from the sync window generator 300 of FIG. 13, and the SYNC DET signal from the sync word comparator and detector initialization section 100 of FIG. 11. Gate circuit 521 is operative to initiate the operation of delay circuit 511 at the end of the window of the previous frame. Transport delay circuit 511 comprises a counter which is reset by the output of gate circuit 521 and counts BAUD CLK signals for a prescribed time differential sufficient to accommodate the differential transport delay between each of loops 1 and 2. For this purpose, as a non-limiting example for a T1 loop, counter 511 may be configured to count up to a carry value that provides a delay on the order of 25 microseconds, so as to allow the window processing circuitry within the frame sync word detection circuitry of the other loop to complete its operation, so that the bit error counts from the FSWL pattern comparator section 200 of each of loops 1 and 2 will be available for analysis by the majority vote logic 93, enabling proper placement of the frame sync signal HDSLFS.

FSWL window counter 501 has four respective outputs 521, 522, 523 and 524 coupled to first inputs 531, 532, 533 and 534 of a select gate logic circuit 540, one of second inputs 541, 542, 543 and 544 of which receives an enabling signal from the majority vote logic 93, based upon which FSWL window has been determined to have the lowest number of bit errors. Select gate logic circuit 540 has a third input 545 coupled to receive the INFRAME signal on link 127 from counter 123 of the sync word comparator and detector initialization section 100 of FIG. 11, described above, and asserts the HDSLFS signal at its output 547 in alignment with the delayed loop data, based upon the FSWL window selected by the majority vote logic circuit 93.

Figure 16:
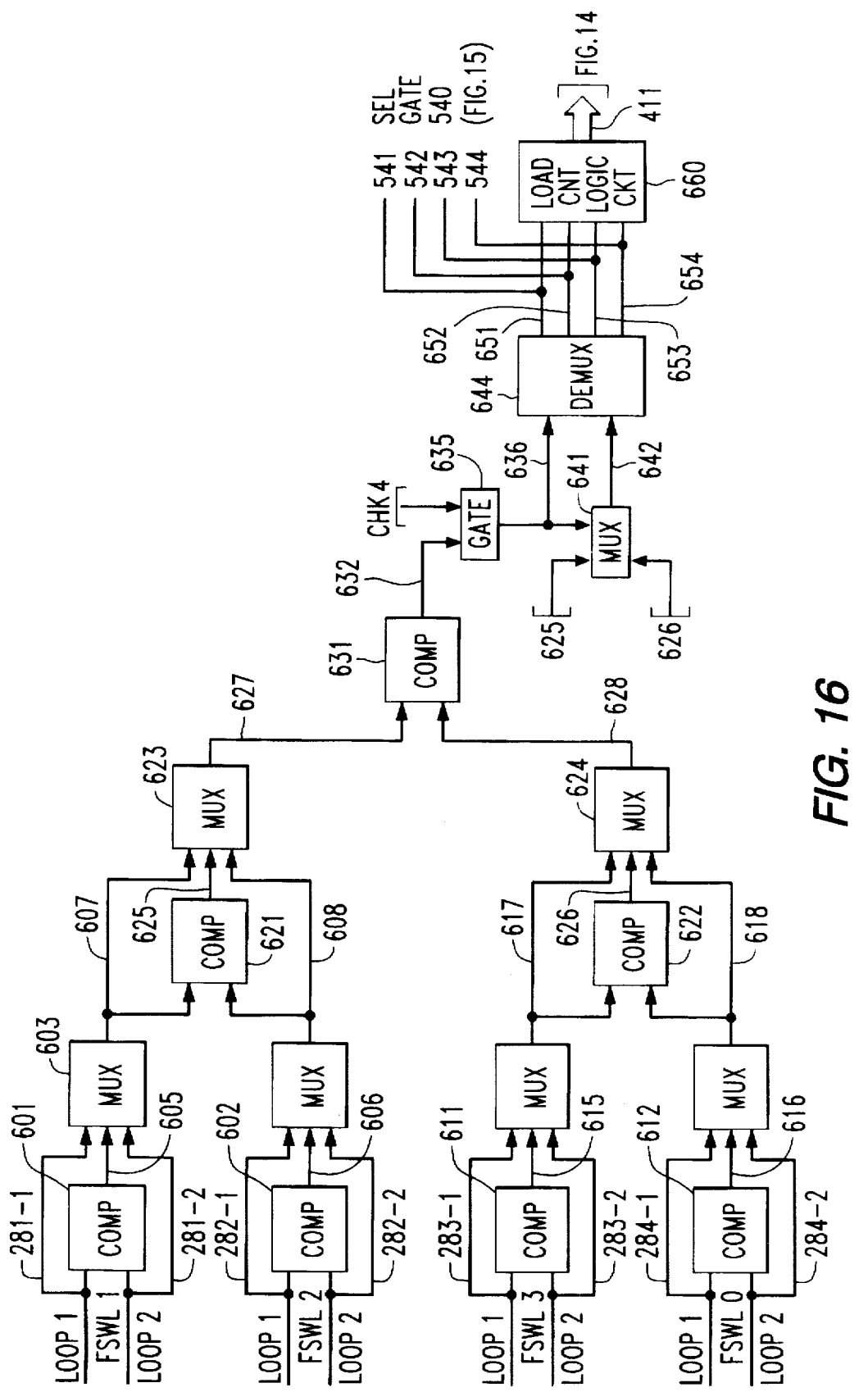
FIG. 16 diagrammatically illustrates the configuration of the majority vote logic circuit of the frame synchronization acquisition architecture of FIG. 9.

The majority vote logic circuit 93 is diagrammatically illustrated in FIG. 16 as comprising a three level or tiered bit error count comparator, that processes the bit error count values in the monitored frame sync pattern contents of the data during the respective FSWL windows, as supplied over respective links 281, 282, 283 and 284 from the counters 271, 272, 273 and 274 of the FSWL pattern comparator section 200 of FIG. 12 for each of loops 1 and 2. Namely, as described previously, the contents of the counters of each loop having two consecutive frame sync detects are processed by the majority vote logic circuit, which determines the lowest error count FSW location as the reference for the next succeeding frame's locations FSWL 1 and FSWL 2.

More particularly, the first level or tier of the bit error count comparator comprises a first set of comparators 601 and 602, associated with FSWL 1 and FSWL 2, respectively, and a second set of comparators 611 and 612, associated with FSWL 3 and FSWL 0, respectively.

To this end, FSWL 1 comparator 601 is coupled to compare the bit error count values associated with FSWL 1 for each of loops 1 and 2, which are respectively supplied to comparator 601 via links 281-1 and 281-2. FSWL 2 comparator 602 is coupled to compare the bit error count values associated with FSWL 2 for each of loops 1 and 2, which are respectively supplied to comparator 602 via links 282-1 and 282-2. FSWL 3 Comparator 603 is coupled to compare the bit error count values associated with FSWL 3 for each of loops 1 and 2, which are respectively supplied to comparator 603 via links 283-1 and 283-2. FSWL 0 Comparator 604 is coupled to compare the bit error count values associated with FSWL 0 for each of loops 1 and 2, which are respectively supplied to comparator 604 via links 284-1 and 284-2.

Links 281-1 and 281-2 are further coupled to an FSWL 1 multiplexer 603, which is controlled via a control link 605 from FSWL 1 comparator 601, which selects the loop having the lowest bit error count. Ideally, the bit error count for each loop is zero. In the event both loops produce the same value, the control output on link 605 defaults to loop 1. The output of FSWL 1 multiplexer 603, which carries the bit count of the least noisy loop, is coupled over link 607 to one input of a second level comparator 621.

Links 282-1 and 282-2 are further coupled to an FSWL 2 multiplexer 604, which is controlled via a control link 606 from FSWL 2 comparator 602, which selects the loop having the lowest bit error count. Again, if both loops produce the same value, the control output on link 606 defaults to loop 1. The output of FSWL 2 multiplexer 604, which carries the bit count of the least noisy loop, is coupled over link 608 to a second input of second level comparator 621.

Links 283-1 and 283-2 are further coupled to an FSWL 3 multiplexer 613, which is controlled via a control link 615 from FSWL 3 comparator 611, which selects the loop having the lowest bit error count. If both loops produce the same value, the control output on link 615 defaults to loop 1. The output of FSWL 3 multiplexer 613, which carries the bit count of the least noisy loop, is coupled over link 617 to one input of a second level comparator 622.

Links 284-1 and 284-2 are further coupled to an FSWL 0 multiplexer 614, which is controlled via a control link 616 from FSWL 0 comparator 612, which selects the loop having the lowest bit error count. Again, if both loops produce the same value, the control output on link 616 defaults to loop 1. The output of FSWL 0 multiplexer 614, which carries the bit count of the least noisy loop, is coupled over link 618 to a second input of second level comparator 622.

Links 607 and 608 are further coupled to a second level multiplexer 623, which is controlled via a control link 625 from comparator 621, which selects which of the previously selected FSWL 1 and FSWL 2 has the lowest bit error count. The output of multiplexer 623 is coupled over link 627 to one input of a third level comparator 631. Similarly, links 617 and 618 are further coupled to a multiplexer 624, which is controlled via a control link 626 from comparator 622, which selects that one of FSWL 3 and FSWL 0 having the lowest bit error count. The output of multiplexer 624 is coupled over link 628 to a second input of third level comparator 631.

The third level comparator 631 is operative to compare which of the bit error counts on links 627 and 628 has the lowest value and provides an output over link 632 to a first input of gate circuit 635. Thus, the output of comparator 631 will indicate which of the four frame sync word locations FSWL 0–3 is the most probable location of the frame sync word. A second input of gate circuit 635 is coupled to receive the check all four locations signal CHK 4 from the error detect logic circuit 131 of FIG. 11, described above, for each loop. If either location FSWL 1 or FSWL 2 for either loop has provided a perfect match of the frame sync word, the CHK 4 signal will not be applied to the second input of gate circuit 635; otherwise, all four possible frame sync word locations FSWL 0–FSWL 3 will be checked.

For this purpose, gate circuit 635 provides an output on link 636 to the control input of a multiplexer 641, which has first and second inputs coupled to links 625 and 626, respectively. The state of the output of gate circuit 635 determines which of the frame sync word location comparison outputs of second comparators 621 and 622 is to be employed to identify the location of the frame sync word. The output of multiplexer 641 on link 642 and the output of gate circuit 635 on link 636 are coupled to respective inputs of a demultiplexer 644, which has four respective outputs 651, 652, 653 and 654 coupled to second inputs links 541, 542, 543 and 544 of the select gate logic circuit 540, so as to selectively provide an enabling signal thereto based upon which FSWL window has been determined to have the lowest number of bit errors.

The outputs 651, 652, 653 and 654 of demultiplexer 644 are also coupled to a load count logic circuit 660, respective outputs of which, associated with FSWL 0–FSWL 3, are coupled over bus 411 for preloading the multi-bit binary counter 401 of the counter-register section 400 of FIG. 14 with a predefined count value, that identifies that one of the four possible frame sync word locations (FSWL 1, FSWL 2, FSWL 3 and FSWL 0), which the majority vote logic circuit 93 has determined to produce the lowest number of bit errors.

OPERATION

As described above, operation of the frame sync acquisition architecture of the present invention shown in FIGS. 10–16 is initiated by the frame sync word detector initialization section 100 detecting a perfect match of the frame sync word FSW in either of the two expected alternative frame sync word locations (FSWL 1 and FSWL 2) of each of a pair of transport loops carrying the multiplexed communication signals. Once the FSW is perfectly identified (bit-for-bit), its location is used as a reference for examining locations FSWL 1 and FSWL 2 of the next succeeding frame.

For this purpose, as incoming data is clocked into shift register 101, pattern comparator 111 compares the data with the stored frame sync pattern reference code. Upon detecting a perfect match between the stored frame sync pattern reference code and the data being clocked through the shift register 101, pattern comparator 111 outputs a SYNC DET output signal. This SYNC DET output signal is coupled to a sync detector counter 121. If the next succeeding SYNC DET output signal occurs within either FSWL 1 or FSWL 2 of an immediately successive frame, sync detector counter 121 generates a GOOD loop output signal which enables the remainder of the sync acquisition circuit. In addition, sync detector counter generates the INFRAME signal, indicating that the sync acquisition circuit is currently synchronized to the frame sync word. The second successive perfect match of the FSW serves as the frame sync reference for the next successive frame of data, namely, each of the FSWL 0–FSWL 3 windows for the next successive frame will be referenced to the FSW of the current frame in accordance with the timing relationship shown in FIG. 8, described above.

Thus, as previously explained, for the next successive frame immediately following the frame wherein the second consecutive FSW match occurred in one of locations FSWL 1 and FSWL 2, and for every succeeding frame, the frame acquisition circuitry will attempt to locate an exact match of the sign portion of the FSW in either of locations FSWL 1 and FSWL 2 (as referenced to the identified FSW location in the current frame). If a perfect match with the frame sync pattern is not detected for six consecutive frames, mismatch counter logic circuit 131 resets the sync detector counter 121 and restarts the initialization operation. For each frame, mismatch counter logic circuit 131 logically combines the sync detect signal SYNC DET and the frame sync word location signals from the frame sync word generator 300 to determine whether there is a perfect match of the frame sync word with locations FSWL 1 or FSWL 2. If not, all four potential locations will be examined by the majority vote logic circuit 93.

Assuming that two consecutive perfect matches with the frame sync word reference pattern have been detected, so that the entirety of the frame sync acquisition circuitry architecture is now initialized, the respective gates 213, 233, 243 and 253 of the FSWL pattern comparator section 200 compare the sign bits of the frame sync pattern reference code with the received data stream at the successive frame sync word locations FSWL 0–FSWL 3, in accordance with respective FSWL window enabling signals generated by four stage counter 301 of the sync window generator 300.

As pointed out above, the respective stages of four stage counter 301 are controllably reset by window control signals output from register 405 of counter-register section 400, which is loaded with the predefined count value supplied from the majority vote logic circuit 93, identifying which of the four possible frame sync word locations (FSWL 1, FSWL 2, FSWL 3 and FSWL 0) produces the lowest number of bit errors. If either location FSWL 1 or FSWL 2 for either loop has provided a perfect match of the frame sync word, as determined by logic circuit 131, only these windows are used to determine the location of the FSW in the current frame; otherwise, it generates a check all four locations signal CHK 4, which is coupled to the majority vote logic circuit 93, so that all four possible frame sync word locations FSWL 0–FSWL 3 will be checked to establish in which location the FSW occurs.

As the input data is serialized through the register 201 and successively delayed via register 223, it is compared, bit-by-bit, with the contents of the sign bits of the frame sync pattern reference code. For each mismatch between a respective bit of the reference code and the windowed data, the contents of associated counters 271, 272, 273 and 274 are incremented, producing respective error counts, for each FSWL.

The contents of counters 271–274 are coupled to the three level comparator circuitry of the majority vote logic circuit 93, which determines which FSW location count has the lowest number of errors and therefore which FSW location is the best choice as the FSW reference for the current frame.

In the counter load interface and frame sync alignment control section 500, the FSWL outputs of the FSWL window counter 501 are combined in select gate logic circuit 540 with one of the enabling signals from the majority vote logic 93, based upon which FSWL window has been determined to have the lowest number of bit errors. The select gate logic circuit 540 asserts the frame sync signal HDSLFS signal in alignment with the delayed loop data, based upon the FSWL window selected by the majority vote logic circuit 93.

Once the frame sync word acquisition circuitry has been initialized, as each successive frame is processed, mismatch counter logic circuit 131 determines whether or not a perfect match with the frame sync word has been detected. If a perfect match with the frame sync pattern is not detected for six consecutive frames, then mismatch logic circuit 131 generates a loss of frame (BAD) signal, which declares the receiver out-of-sync, and causes the synchronization mechanism to be re-initialized, again looking for two consecutive frames in which an exact match must occur in one of locations FSWL 1 and FSWL 2, in order to reacquire sync.

As will be appreciated from the foregoing description, the above-discussed problem of being unable to accurately locate the frame synchronization word (FSW) within successive selectively bit-stuffed frames of data is solved in accordance with the frame sync acquisition mechanism of the present invention, which not only looks in a respective frame for the frame sync word in the two expected alternative frame sync word locations FSWL 1 or FSWL 2, based upon either the addition of stuff bits or the lack of such stuff bits, but also selectively examines a pair of additional potential locations FSWL 3 and FSWL 0, one of which (FSWL 0) precedes FSWL 1, and the other of which (FSWL 3) succeeds FSWL 2.

As pointed out above, if an exact match with the FSW is located in either of location FSWL 1 or location FSWL 2, that location is selected as the FSW reference for the next succeeding frame. Then, during the search of the next successive frame and for every succeeding frame, the invention initially attempts to locate an exact match of the sign portion of the FSW in either of locations FSWL 1 and FSWL 2 (relative to the identified FSW location in the immediately succeeding frame). If unable to do so, the search is expanded to encompass the entire window of FSW location uncertainty, so as to include the two additional FSW locations FSWL 0 and FSWL 3. During this expanded search, that one of FSWL 0–FSWL 3, which yields the smallest number of bit errors in the compared sign portions of the known FSW and the bit contents of the frame sync word location being examined, is declared as the reference FSW location for the next succeeding frame. If there is a failure to find an exact match between the FSW of a respective frame and the contents of the examined FSW locations FSWL 1 and FSWL 2 for the next immediately successive frame over the course of six successive frames, an out-of-sync condition is declared, and the frame sync acquisition mechanism is re-initialized.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A method for detecting a prescribed signal pattern in successive frames of signals, which selectively include additional stuff signals, so that the lengths of respective frames vary between a first length containing no additional stuff signals, and a second length containing said additional stuff signals, and thereby enable information signals to be recovered from said successive frames, comprising the steps of:

(a) examining signal contents of said successive frames of signals to detect said prescribed signal pattern;

(b) in response to step (a) detecting said prescribed signal pattern, examining signal contents of first and second portions of a successive frame of signals for the presence of said prescribed signal pattern therein; and (c) in response to step (b) failing to detect said prescribed signal pattern in either of said first and second portions of said successive frame of signals, examining signal contents of third and fourth portions of said successive frame of signals for the presence of said prescribed signal pattern therein.

2. A method according to claim 1, wherein boundaries of said first, second, third and fourth portions of said successive frame of signals are successively offset from one another.

3. A method according to claim 1, wherein boundaries of said first, second, third and fourth portions of said successive frame of signals are successively offset from one another by the duration of said additional stuff signals.

4. A method according to claim 1, wherein said third portion of said successive frame of signals has a boundary successively offset from that of said second portion of said successive frame of signals, and wherein said fourth portion of said successive frame of signals has a boundary prior to that of said first portion of said successive frame of signals.

5. A method according to claim 1, further including the step of:

(d) in response to step (c) detecting said prescribed signal pattern in one of said third and fourth portions of said successive frame of signals, examining contents of first and second portions of the next successive frame of signals for the presence of said prescribed signal pattern therein, said first and second portions of the next successive frame of signals being spaced apart from said one of said third and fourth portions of said successive frame of signals by the same signal spacing as said first and second portions of said successive frame of signals are respectively spaced apart from said prescribed signal pattern detected in step (a).

6. A method according to claim 5, further including the steps of:

(e) in response to step (d) failing to detect said prescribed signal pattern in either of said third and fourth portions of said successive frame of signals, determining which of said first, second, third and fourth portions of said successive frame of signals is the most likely portion of said successive frame of signals to contain said prescribed signal pattern; and (f) examining contents of first and second portions of the next successive frame of signals for the presence of said prescribed signal pattern therein, said first and second portions of the next successive frame of signals being spaced apart from said most likely portion of said successive frame of signals by the same signal spacing as said first and second portions of said successive frame of signals are respectively spaced apart from said prescribed signal pattern detected in step (a).

7. A method according to claim 6, wherein step (e) comprises determining which of said first, second, third and fourth portions of said successive frame of signals is the most likely portion of said successive frame of signals to contain said prescribed signal pattern in accordance with which of said first, second, third and fourth portions of said successive frame of signals has the smallest difference in signal content relative to said prescribed signal pattern.

8. A method according to claim 1, wherein step (a) comprises examining signal contents of said successive frames of signals until said prescribed signal pattern is detected in either of said first and second portions of two consecutive frames of signals, and wherein step (b) comprises, in response to step (a) detecting said prescribed signal pattern in either of said first and second portions of two consecutive frames of signals, examining signal contents of first and second portions of a successive frame immediately following a second consecutive one of said two consecutive frames of signals for the presence of said prescribed signal pattern therein.

9. A method according to claim 8, wherein step (c) further comprises, in response to step (b) failing to detect said prescribed signal pattern in either of said first and second portions of said successive frame of signals, examining signal contents of third and fourth portions of said successive frame of signals for the presence of said prescribed signal pattern therein.

10. A method according to claim 1, wherein step (a) comprises examining signal contents of said successive frames of signals until said prescribed signal pattern is detected in either of said first and second portions of two consecutive frames of signals, and wherein step (b) comprises, in response to step (a) detecting said prescribed signal pattern in either of said first and second portions of two consecutive frames of signals, examining signal contents of first and second portions of further frames following a second consecutive one of said two consecutive frames of signals for the presence of said prescribed signal pattern therein, and wherein step (c) comprises, in response to step (b) failing to detect said prescribed signal pattern in either of said first and second portions of said further frames of signals, examining signal contents of third and fourth portions of said further frames of signals for the presence of said prescribed signal pattern therein.

11. A method according to claim 10, further including the step of:

(d) in response to step (b) failing to detect said prescribed signal pattern in either of said first and second portions of a prescribed plurality of said further frames of signals, returning to step (a).

12. A method according to claim 1, wherein step (a) comprises examining signal contents of successive frames of signals transported over separate signal paths to detect said prescribed signal pattern, step (b) comprises, in response to step (a) detecting said prescribed signal pattern for either of said separate signal paths, examining signal contents of first and second portions of a successive frame of signals on each of said signal paths for the presence of said prescribed signal pattern therein, and step (c) comprises, in response to step (b) failing to detect said prescribed signal pattern in either of said first and second portions of said successive frame of signals on either of said signal paths, examining signal contents of third and fourth portions of said successive frame of signals on each of said signal paths for the presence of said prescribed signal pattern therein.

13. A method according to claim 12, further including the step of:

(d) in response to step (c) detecting said prescribed signal pattern in one of said third and fourth portions of said successive frame of signals of either of said signal paths, examining contents of first and second portions of the next successive frame of signals of each of said signal paths for the presence of said prescribed signal pattern therein, said first and second portions of the next successive frame of signals of each of said signal paths being spaced apart from said one of said third and fourth portions of said successive frame of signals of each of said signal paths by the same signal spacing as said first and second portions of said successive frame of signals of each of said signal paths are respectively spaced apart from said prescribed signal pattern detected in step (a).

14. A method according to claim 13, further including the steps of:

(e) in response to step (d) failing to detect said prescribed signal pattern in either of said third and fourth portions of said successive frame of signals of each of said signal paths, determining which of said first, second, third and fourth portions of said successive frame of signals in each of said signal paths is the most likely portion of said successive frame of signals to contain said prescribed signal pattern; and (f) examining contents of first and second portions of the next successive frame of signals of each of said signal paths for the presence of said prescribed signal pattern therein, said first and second portions of the next successive frame of signals of each of said signal paths being spaced apart from said most likely portion of said successive frame of signals by the same signal spacing as said first and second portions of said successive frame of signals are respectively spaced apart from said prescribed signal pattern detected in step (a).

15. A method according to claim 14, wherein step (e) comprises determining which of said first, second, third and fourth portions of said successive frame of signals of each of said signal paths is the most likely portion of said successive frame of signals to contain said prescribed signal pattern in accordance with which of said first, second, third and fourth portions of said successive frame of signals of each of said signal paths has the smallest difference in signal content relative to said prescribed signal pattern.

16. A method according to claim 12, wherein step (a) comprises examining signal contents of said successive frames of signals of each of said signal paths until said prescribed signal pattern is detected in either of said first and second portions of two consecutive frames of signals of either of said signal paths, and wherein step (b) comprises, in response to step (a) detecting said prescribed signal pattern in either of said first and second portions of two consecutive frames of signals of either of said signal paths, examining signal contents of first and second portions of a successive frame of signals immediately following a second consecutive one of said two consecutive frames of signals for the presence of said prescribed signal pattern therein.

17. A method according to claim 16, wherein step (c) further comprises, in response to step (b) failing to detect said prescribed signal pattern in either of said first and second portions of said successive frame of signals of either of said signal paths, examining signal contents of third and fourth portions of said successive frame of signals of each of said signal paths for the presence of said prescribed signal pattern therein.

18. A method according to claim 12, wherein step (a) comprises examining signal contents of said successive frames of signals of each of said signal paths until said prescribed signal pattern is detected in either of said first and second portions of two consecutive frames of signals of either of said signal paths, and wherein step (b) comprises, in response to step (a) detecting said prescribed signal pattern in either of said first and second portions of two consecutive frames of signals of either of said signal paths, examining signal contents of first and second portions of further frames following a second consecutive one of said two consecutive frames of signals for the presence of said prescribed signal pattern therein, and wherein step (c) comprises, in response to step (b) failing to detect said prescribed signal pattern in either of said first and second portions of said further frames of signals of either of said signal paths, examining signal contents of third and fourth portions of said further frames of signals of each of said signal paths for the presence of said prescribed signal pattern therein.

19. A method according to claim 18, further including the step of:

(d) in response to step (b) failing to detect said prescribed signal pattern in either of said first and second portions of a prescribed plurality of said further frames of signals of either of said signal paths, returning to step (a) for each of said signal paths.

20. A method according to claim 12, wherein boundaries of said first, second, third and fourth portions of said successive frame of signals of each of said signal paths are successively offset from one another by the duration of said additional stuffing signals.

21. A method of acquiring frame synchronization of frames of digital data, each frame including a digital frame synchronization code and data, and some frames including additional stuff bits, so that the lengths of said some frames are longer than those of other frames containing no additional stuff bits, comprising the steps of:

(a) examining contents of digital data for the presence of said frame synchronization code;

(b) in response to step (a) detecting said frame synchronization code, examining contents of first and second portions of a frame of digital data, that follows said frame synchronization code detected in step (a) by first and second frame lengths, respectively, for the presence of said frame synchronization code; and (c) in response to step (b) failing to detect said frame synchronization code in either of said first and second portions of said frame of digital data, examining contents of third and fourth portions of said frame of digital data, that follow said frame synchronization code detected in step (a) by third and fourth frame lengths, respectively, different from said first and second frame lengths, for the presence of said frame synchronization code.

22. A method according to claim 21, wherein step (a) comprises examining contents of successive frames transported over separate signal paths to detect said frame synchronization code, step (b) comprises, in response to step (a) detecting said frame synchronization code for either of said separate signal paths, examining contents of first and second portions of said frame of digital data on each of said signal paths for the presence of said frame synchronization code therein, and step (c) comprises, in response to step (b) failing to detect said frame synchronization code in either of said first and second portions of said frame of digital data on either of said signal paths, examining contents of third and fourth portions of said frame of digital data on each of said signal paths for the presence of said frame synchronization code therein.

23. A method according to claim 21, wherein boundaries of said first, second, third and fourth portions of said frame of digital data are successively offset from one another by the duration of said additional stuff bits.

24. An arrangement for acquiring frame synchronization of frames of digital data, each frame including a digital frame synchronization code and data, and some frames including additional stuff bits, so that the lengths of said some frames are longer than those of other frames containing no additional stuff bits, said arrangement comprising:

a frame synchronization code detector to which successive frames of digital data are applied, and which is operative to generate a sync detection signal in response to detecting a match between said frame synchronization code and contents of a frame of digital data;

a frame synchronization code comparator to which said successive frames of digital data are applied, and which is responsive to said sync detection signal to compare said frame synchronization code with first, second, third and fourth portions of a frame of digital data, that follows, by first, second, third and fourth frame lengths, respectively, said contents of said frame of digital data for which said frame synchronization code detector has detected said match with said frame synchronization code, a first length corresponding to a frame length having no additional stuff bits, a second length corresponding to a frame length having said additional stuff bits, a third length corresponding to said second frame length plus said additional stuff bits, and a fourth length corresponding to said first frame length minus said additional stuff bits; and a majority vote logic circuit, which, in response to said frame synchronization code comparator failing to detect said frame synchronization code in either of said first and second portions of said frame of digital data, is operative to identify one of said first, second, third and fourth portions of said frame of digital data as containing said frame synchronization code in accordance with the result of said frame synchronization code comparator comparing said frame synchronization code with said first, second, third and fourth portions of said frame of digital data.

25. An arrangement according to claim 24, wherein said successive frames of digital data are derived from separate signalling paths, and wherein said majority vote logic circuit, in response to said frame synchronization code comparator failing to detect said frame synchronization code in either of said first and second portions of said frame of digital data for either of said separate signalling paths, is operative to identify one of said first, second, third and fourth portions of said frame of digital data as containing said frame synchronization code, in accordance with the result of said frame synchronization code comparator comparing said frame synchronization code with said first, second, third and fourth portions of said frame of digital data for each of said signalling paths.

26. An arrangement according to claim 24, wherein boundaries of said first, second, third and fourth portions of said frame of digital data are successively offset from one another by the duration of said additional stuff bits.

27. An arrangement according to claim 24, further including a window generator which is operative to apply respectively delayed window signals to said frame synchronization code comparator for controlling comparison thereby of said frame synchronization code with said first, second, third and fourth portions of said frame of digital data.

28. An arrangement according to claim 27, further including a frame duration counter and a multistage register, said frame duration counter being controllably loaded with a predefined count value supplied from said majority vote logic circuit, which identifies one of said first, second, third and fourth portions of said frame of digital data in accordance with said result of said frame synchronization code comparator comparing said frame synchronization code with said first, second, third and fourth portions of said frame of digital data, said multistage register being responsive to the count output of said frame duration counter and having a plurality of outputs which provide successively delayed control signals for controlling the generation of said respectively delayed window signals by said window generator.

29. An arrangement according to claim 27, further including a frame synchronization code alignment control unit, coupled with said majority vote logic circuit, and being operative to generate a frame sync signal, coincident with that portion of said frame of digital data aligned with said identified one of said first, second, third and fourth portions of said frame of digital data having been determined by said majority vote logic circuit to contain said frame synchronization code.

30. A frame sync acquisition method for locating a frame sync word within successive selectively bit-stuffed frames of data comprising the steps of:
   (a) examining a frame of data for said frame sync word in two expected alternative frame sync word locations based upon either the lack of stuff bits or the addition of such stuff bits, and examining a pair of additional locations of said frame of data, one of which precedes and the other of which succeeds said two expected alternative frame sync word locations;
   (b) in response to step (a) detecting an exact match with the frame sync word in either of said expected alternative locations, selecting a location as a reference frame for the next succeeding frame;
   (c) during a search of the next successive frame and for every succeeding frame, initially attempting to match said frame sync word with in either of said expected alternative locations;
   (d) in response to step (c) failing to achieve a match, expanding said search to encompass a larger window of frame sync word location uncertainty that includes said pair of additional locations; and
   (e) during step (d), declaring a location which yields the smallest number of bit errors as the frame sync word reference location for the next succeeding frame.

31. A method according to claim 30, further including the step of:
   (f) in response to a failure to find an exact match over the course of a plurality of successive frames in steps (a)–(e), declaring an out-of-sync condition.

32. An arrangement for detecting a prescribed signal pattern in successive frames of signals, which selectively include additional stuff signals, so that the lengths of respective frames vary between a first length containing no additional stuff signals, and a second length containing said additional stuff signals, and thereby enable information signals to be recovered from said successive frames, said arrangement comprising the combination of:
   a frame synchronization code detector which examines signal contents of said successive frames of signals to detect said prescribed signal pattern; and
   a frame synchronization code comparator which, in response to said frame synchronization code detector detecting said prescribed signal pattern, is operative to examine signal contents of first and second portions of a successive frame of signals for the presence of said prescribed signal pattern therein and, in response to failing to detect said prescribed signal pattern in either of said first and second portions of said successive frame of signals, is operative to examine signal contents of third and fourth portions of said successive frame of signals for the presence of said prescribed signal pattern therein.

33. An arrangement according to claim 32, wherein boundaries of said third, first, second and fourth portions of said successive frame of signals are successively offset from one another.

34. An arrangement according to claim 32, wherein boundaries of said first, second, third and fourth portions of said successive frame of signals are successively offset from one another by the duration of said additional stuff signals.

35. An arrangement according to claim 32, wherein said third portion of said successive frame of signals has a boundary successively offset from that of said second portion of said successive frame of signals, and wherein said fourth portion of said successive frame of signals has a boundary prior to that of said first portion of said successive frame of signals.

36. An arrangement according to claim 32, further including a majority vote logic circuit, which is operative, in response to said frame synchronization code comparator detecting said prescribed signal pattern in one of said third and fourth portions of said successive frame of signals, to cause said frame synchronization code comparator to examine contents of first and second portions of the next successive frame of signals for the presence of said prescribed signal pattern therein, said first and second portions of the next successive frame of signals being spaced apart from said one of said third and fourth portions of said successive frame of signals by the same signal spacing as said first and second portions of said successive frame of signals are respectively spaced apart from said detected prescribed signal pattern detected.

37. An arrangement according to claim 36, wherein said majority vote logic circuit, in response to said frame synchronization code comparator failing to detect said prescribed signal pattern in either of said third and fourth portions of said successive frame of signals, is operative to determine which of said first, second, third and fourth portions of said successive frame of signals is the most likely portion of said successive frame of signals to contain said prescribed signal pattern, and to cause said frame synchronization code comparator to examine contents of first and second portions of the next successive frame of signals for the presence of said prescribed signal pattern therein, said first and second portions of the next successive frame of signals being spaced apart from said most likely portion of said successive frame of signals by the same signal spacing as said first and second portions of said successive frame of signals are respectively spaced apart from said detected prescribed signal pattern.

38. An arrangement according to claim 37, wherein said majority vote logic circuit is operative to determine which of said first, second, third and fourth portions of said successive frame of signals is the most likely portion of said successive frame of signals to contain said prescribed signal pattern in accordance with which of said first, second, third and fourth portions of said successive frame of signals has the smallest difference in signal content relative to said prescribed signal pattern.

39. An arrangement according to claim 32, wherein said frame synchronization code detector is operative to examine signal contents of said successive frames of signals until said prescribed signal pattern is detected in either of said first and second portions of two consecutive frames of signals and, in response to detecting said prescribed signal pattern in either of said first and second portions of two consecutive frames of signals, is operative to examine signal contents of first and second portions of a successive frame immediately following a second consecutive one of said two consecutive frames of signals for the presence of said prescribed signal pattern therein.

40. An arrangement according to claim 39, wherein said frame synchronization code comparator, in response to failing to detect said prescribed signal pattern in either of said first and second portions of said successive frame of signals, is operative to examine signal contents of third and fourth portions of said successive frame of signals for the presence of said prescribed signal pattern therein.

41. An arrangement according to claim 32, wherein said frame synchronization code detector is operative to examine signal contents of said successive frames of signals until said prescribed signal pattern is detected in either of said first and second portions of two consecutive frames of signals, and wherein said frame synchronization code comparator, in response to said frame synchronization code detector detecting said prescribed signal pattern in either of said first and second portions of two consecutive frames of signals, is operative to examine signal contents of first and second portions of further frames following a second consecutive one of said two consecutive frames of signals for the presence of said prescribed signal pattern therein and, in response to failing to detect said prescribed signal pattern in either of said first and second portions of said further frames of signals, is operative to examine signal contents of third and fourth portions of said further frames of signals for the presence of said prescribed signal pattern therein.

42. An arrangement according to claim 41, further including an out of sync detector which is operative to declare a loss of sync condition, in response to said frame synchronization code comparator failing to detect said prescribed signal pattern in either of said first and second portions of a prescribed plurality of said further frames of signals.

43. An arrangement according to claim 32, wherein said frame synchronization code detector comprises first and second frame synchronization code detector circuits, which are operative to examine signal contents of successive frames of signals transported over respectively separate signal paths to detect said prescribed signal pattern, and wherein said frame synchronization code comparator comprises first and second frame synchronization code comparator circuits which, in response to respective ones of said first and second frame synchronization code detector circuits detecting said prescribed signal pattern for respective ones of said separate signal paths, are operative to examine signal contents of first and second portions of a successive frame of signals on respective ones of said signal paths for the presence of said prescribed signal pattern therein and, in response to failing to detect said prescribed signal pattern in either of said first and second portions of said successive frame of signals on either of said signal paths, examine signal contents of third and fourth portions of said successive frame of signals on each of said signal paths for the presence of said prescribed signal pattern therein.

44. An arrangement according to claim 43, wherein each of said first and second frame synchronization code comparator circuits, in response to either of said first and second frame synchronization code comparator circuits detecting said prescribed signal pattern in a respective one of said third and fourth portions of said successive frame of signals of a respective one of said signal paths, is operative to examine contents of first and second portions of the next successive frame of signals of a respective signal path for the presence of said prescribed signal pattern therein, said first and second portions of the next successive frame of signals of each of said signal paths being spaced apart from said one of said third and fourth portions of said successive frame of signals of a respective signal path by the same signal spacing as said first and second portions of said successive frame of signals of a respective signal path are respectively spaced apart from said prescribed detected signal pattern detected.

45. An arrangement according to claim 44, further including a majority vote logic circuit which is operative, in response to said first and second frame synchronization comparator circuits failing to detect said prescribed signal pattern in either of said third and fourth portions of said successive frame of signals of each of said signal paths, to determine which of said first, second, third and fourth portions of said successive frame of signals in each of said signal paths is the most likely portion of said successive frame of signals to contain said prescribed signal pattern, and to cause said first and second frame synchronization comparator circuits to examine contents of first and second portions of the next successive frame of signals of each of said signal paths for the presence of said prescribed signal pattern therein, said first and second portions of the next successive frame of signals of each of said signal paths being spaced apart from said most likely portion of said successive frame of signals by the same signal spacing as said first and second portions of said successive frame of signals are respectively spaced apart from said detected prescribed signal pattern.

46. An arrangement according to claim 45, wherein said majority vote logic circuit is operative to determine which of said first, second, third and fourth portions of said successive frame of signals of each of said signal paths is the most likely portion of said successive frame of signals to contain said prescribed signal pattern in accordance with which of said first, second, third and fourth portions of said successive frame of signals of each of said signal paths has the smallest difference in signal content relative to said prescribed signal pattern.

* * * * *